(12) United States Patent
Norimatsu et al.

(10) Patent No.: US 11,776,304 B2
(45) Date of Patent: Oct. 3, 2023

(54) BIOLOGICAL PATTERN INFORMATION PROCESSING DEVICE, BIOLOGICAL PATTERN INFORMATION PROCESSING METHOD AND PROGRAM

(71) Applicant: NEC Corporation, Tokyo (JP)

(72) Inventors: Koui Norimatsu, Tokyo (JP); Masanori Mizoguchi, Tokyo (JP); Hirokazu Okazaki, Tokyo (JP); Kan Satou, Tokyo (JP); Yoshinori Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 181 days.

(21) Appl. No.: 17/146,117

(22) Filed: Jan. 11, 2021

(65) Prior Publication Data

US 2021/0133414 A1 May 6, 2021

Related U.S. Application Data

(63) Continuation of application No. 15/563,207, filed as application No. PCT/JP2016/061330 on Mar. 31, 2016, now Pat. No. 10,915,728.

(30) Foreign Application Priority Data

Mar. 31, 2015 (JP) .................. 2015-074424

(51) Int. Cl.
*G06V 40/12* (2022.01)
*G06T 7/00* (2017.01)
*G06T 11/20* (2006.01)

(52) U.S. Cl.
CPC ............ *G06V 40/1376* (2022.01); *G06T 7/00* (2013.01); *G06T 11/20* (2013.01); *G06V 40/1347* (2022.01); *G06V 40/1359* (2022.01)

(58) Field of Classification Search
None
See application file for complete search history.

(56) References Cited

U.S. PATENT DOCUMENTS 5,659,626 A * 8/1997 Ort ..................... G07C 9/37
382/125
9,342,731 B1   5/2016 Khan
(Continued)

FOREIGN PATENT DOCUMENTS

CN   1716224 A  *  1/2006
CN   101401419 A  *  4/2009 ......... H04N 21/4143
(Continued)

OTHER PUBLICATIONS

EP Office Action for EP Application No. 16773269.2 dated Aug. 6, 2021.
(Continued)

*Primary Examiner* — Jiangeng Sun

(57) ABSTRACT

A biological pattern information processing device includes: a detection result obtaining unit that obtains unique region information that is detected based on biological pattern information representing a biological pattern, the unique region information representing a unique region included in the biological pattern; and a display control unit that causes the unique region to be displayed using a display attribute, based on the obtained unique region information, the display attribute being different from that for a region of the biological pattern other than the unique region.

15 Claims, 16 Drawing Sheets

(56) References Cited

U.S. PATENT DOCUMENTS

| | | | | |
|---|---|---|---|---|
| 2003/0021452 A1* | 1/2003 | Hamid | ............... | G06V 40/1347 |
| | | | | 382/124 |
| 2003/0225693 A1* | 12/2003 | Ballard | ................ | G06Q 20/108 |
| | | | | 705/42 |
| 2011/0044514 A1* | 2/2011 | Rahmes | ............. | G06V 40/1347 |
| | | | | 382/124 |
| 2012/0189171 A1 | 7/2012 | Abiko et al. | | |
| 2012/0224041 A1 | 9/2012 | Monden | | |
| 2014/0020090 A1 | 1/2014 | Nada et al. | | |
| 2017/0083742 A1* | 3/2017 | Lamare | ............. | G06V 40/1394 |

FOREIGN PATENT DOCUMENTS

| | | | | | |
|---|---|---|---|---|---|
| CN | 101751728 | A | * | 6/2010 | |
| CN | 101877754 | B | * | 11/2012 | ............. G06F 21/34 |
| EP | 1574985 | A1 | | 9/2005 | |
| JP | 2000-057343 | A | | 2/2000 | |
| JP | 2006-078380 | A | | 3/2006 | |
| JP | 2006-266766 | A | | 10/2006 | |
| JP | 2013-171306 | A | | 9/2013 | |
| JP | 2013-171325 | A | | 9/2013 | |
| WO | 01/41068 | A1 | | 6/2001 | |
| WO | 2011/058836 | A1 | | 5/2011 | |
| WO | 2011052036 | A1 | | 5/2011 | |
| WO | 2012/127630 | A1 | | 9/2012 | |

OTHER PUBLICATIONS

Bakhtiari Somayeh et al: "Local fingerprint image reconstruction based on gabor filtering", Mobile Multimedia/Image Processing, Security, and Applications 2012, SPIE, 1000 20th St. Bellingham WA, 98225-6705 USA, vol. 8406, No. 1, May 11, 2012 (May 11, 2012), pp. 1-11, XP060003343, DOI:10.1117/12.918384 [retrieved on May 3, 2012].

Japanese Office Communication for JP Application No. 2020-034214 dated Sep. 14. 2021 with English Translation.

Asker M. Bazen, "Fingerprint Identification—Feature Extraction, Matching, and Database Search," Twente University Press, Aug. 19, 2002, 195 pages.

Communication dated May 21, 2019, from the Japanese Patent Office in counterpart application No. 2017-510275.

Communication dated Nov. 9, 2018, from the European Patent Office in counterpart European Application No. 16773269.2.

Esan, et al., "Bimodal biometrics for financial infrastructure security", Information Security for South Africa, IEEE, Aug. 14, 2013 (8 pages total).

International Search Report of PCT/JP2016/061330 dated Jun. 14, 2016.

Le, et al., "A fingerprint recognizer using fuzzy evolutionary programming", Proceedings of the 34th Hawaii International Conference on System Sciences—2001, IEEE, Jan. 3, 2001 (7 pages total).

Li, et al., "Image Enhancement Method for Fingerprint Recognition System", Engineering in Medicine and Biology 27th Annual Conference, Shanghai, China, Sep. 1, 2005, pp. 3386-3389 (4 pages total).

Thakur, et al., "Minutiae extraction and recognition of finger print", GV-ICRTEDC-64, May 2014, vol. 1, No. 2, pp. 242-246 (6 pages total).

Japanese Office Action for JP Application No. 2021-168962 dated Nov. 8, 2022 with English Translation.

Taichiro Nakamori, "Access Management System 'SESAMO-IDs' Fingerprint Authentication System Which Enable to Check Fingerprint even by Wet Finger", Monthly Barcode, vol. 16 No. 8, Japan Industrial Publishing Co., Ltd., Jul. 2, 2003.

* cited by examiner

BIOLOGICAL PATTERN INFORMATION PROCESSING DEVICE, BIOLOGICAL PATTERN INFORMATION PROCESSING METHOD AND PROGRAM

CROSS REFERENCE TO RELATED APPLICATIONS

This application is a continuation of U.S. patent application Ser. No. 15/563,207 filed Sep. 29, 2017, which is a National Stage of International Application No. PCT/JP2016/061330 filed Mar. 31, 2016, claiming priority based on Japanese Patent Application No. 2015-074424 filed Mar. 31, 2015, the contents of all of which are incorporated herein by reference in their entirety.

TECHNICAL FIELD

The present invention relates to a biological pattern information processing device, a biological pattern information processing method and a program.

BACKGROUND ART

In recent years, biological authentication has been receiving attention as one of the authentication systems for identifying individuals. A biological pattern such as a fingerprint is a feature that does not change with the passage of time, and so its reliability in authentication is high. On the other hand, there is also the possibility of unlawful acts being performed using fake biological patterns such as a fake finger, with technology also being developed to prevent such unlawful acts.

For example, the technology disclosed in Patent Document 1 is technology for determining a fake finger wherein a transparent thin film has been attached to the surface of the finger. Patent Document 1 discloses technology that classifies a region of an image, using colors of pixels included in the captured image, into a plurality of regions including at least a skin region and a background region, and determines whether foreign matter is present in the vicinity of the finger, using the features of the regions that have not been classified into either the skin region or the background region. According to the technology of Patent Document 1, it is possible to detect foreign matter in the vicinity of the finger (a region having a biological pattern).

PRIOR ART DOCUMENTS

Patent Documents

[Patent Document 1] PCT International Publication No. WO 2011/058836

DISCLOSURE OF THE INVENTION

Problem to be Solved by the Invention

However, there are cases in which simply detecting foreign matter (for example, a thin film) on the basis of color information of pixels has been insufficient for preventing impropriety related to authentication using a biological pattern.

For example, in recent years, cases have been discovered of biological patterns (for example, fingerprints) being damaged by surgical operations or burn injuries or the like. In such cases, when a biological pattern that has been registered in advance is damaged, it is required to be able to correctly perform collation or at least to detect that there is damage. Also, it is required to present the detected damage to the user in a readily understandable manner.

The present invention was achieved in recognition of the aforementioned issues. An exemplary object of the present invention is to provide a biological pattern information processing device, a biological pattern information processing method and a program that, when a biological pattern has a unique region due to damage or the like, can detect the unique region and present to the user the detected unique region in an easily understandable manner.

Means for Solving the Problem

A biological pattern information processing device according to an exemplary aspect of the present invention includes: a detection result obtaining unit that obtains unique region information that is detected based on biological pattern information representing a biological pattern, the unique region information representing a unique region included in the biological pattern; and a display control unit that causes the unique region to be displayed using a display attribute, based on the obtained unique region information, the display attribute being different from that for a region of the biological pattern other than the unique region.

In the aforementioned biological pattern information processing device, the display control unit may cause a type of the unique region to be displayed based on the unique region information.

In the aforementioned biological pattern information processing device, the display control unit may switch display between: display of the unique region; display of a region of the biological pattern other than the unique region; and both of the display of the unique region and the display of the region of the biological pattern other than the unique region.

In the aforementioned biological pattern information processing device, the display control unit may obtain biological pattern information that has been repaired to biological pattern information with no unique region based on the unique region information, and may cause the repaired biological pattern information to be displayed.

A biological pattern information processing method according to an exemplary aspect of the present invention includes: obtaining unique region information that is detected based on biological pattern information representing a biological pattern, the unique region information representing a unique region included in the biological pattern; and causing the unique region to be displayed using a display attribute, based on the obtained unique region information, the display attribute being different from that for a region of the biological pattern other than the unique region.

The aforementioned biological pattern information processing method may further include: causing a type of the unique region to be displayed based on the unique region information.

The aforementioned biological pattern information processing method may further include switching display between: display of the unique region; display of a region of the biological pattern other than the unique region; and both of the display of the unique region and the display of the region of the biological pattern other than the unique region.

The aforementioned biological pattern information processing method may further include: obtaining biological pattern information that has been repaired to biological pattern information with no unique region based on the unique region information; and causing the repaired biological pattern information to be displayed.

A program according to an exemplary aspect of the present invention causes a computer to execute: obtaining unique region information that is detected based on biological pattern information representing a biological pattern, the unique region information representing a unique region included in the biological pattern; and causing the unique region to be displayed using a display attribute, based on the obtained unique region information, the display attribute being different from that for a region of the biological pattern other than the unique region.

Effect of the Invention

According to the present invention, when a unique region such as damage exists in a biological pattern, it is possible to present to the user in a readily understandable manner that there is that unique region. That is, it is possible for a user to readily distinguish where a unique region is located.

EMBODIMENTS FOR CARRYING OUT THE INVENTION

Next, a plurality of exemplary embodiments of the present invention will be described referring to the appended drawings.

First Exemplary Embodiment

Figure 1:
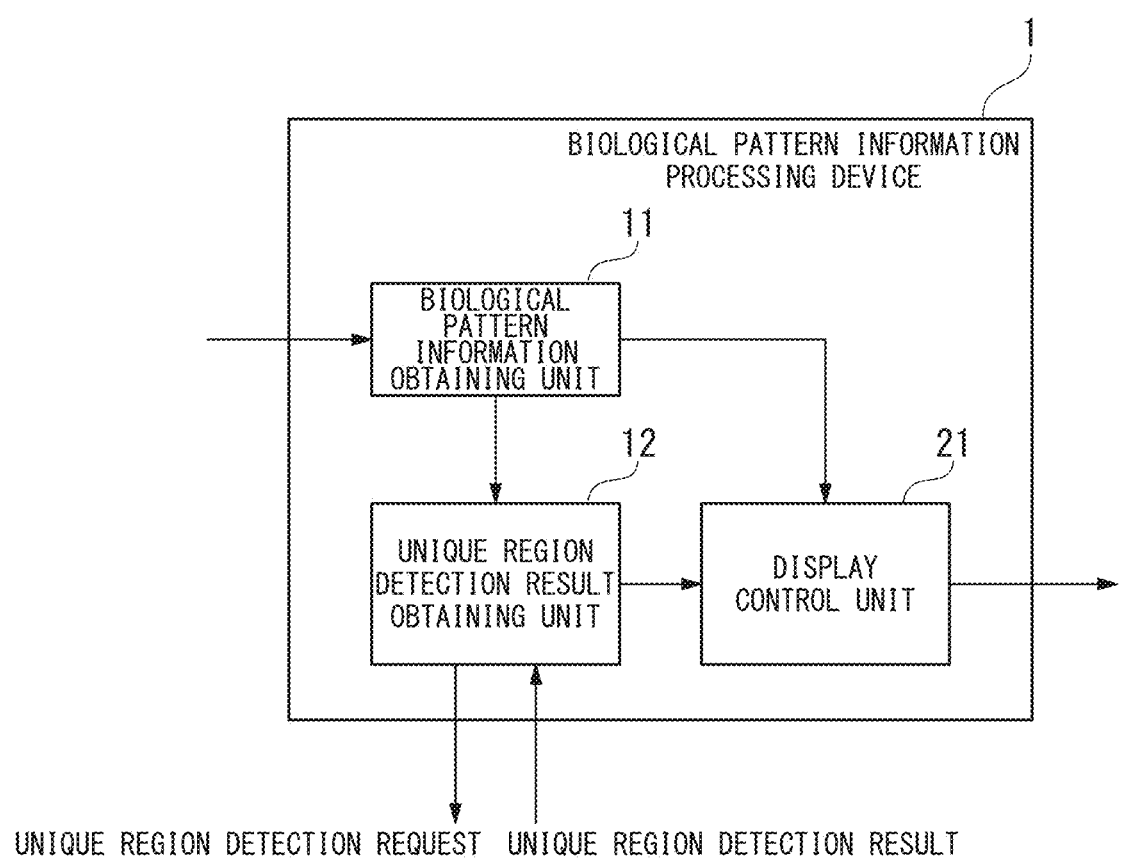
FIG. 1 is a block diagram that shows the schematic function configuration of the biological pattern information processing device according to the first exemplary embodiment.

FIG. 1 is a block diagram that shows the schematic function configuration of the biological pattern information processing device according to the first exemplary embodiment. As shown in FIG. 1, the biological pattern information processing device 1 according to this exemplary embodiment includes a biological pattern information obtaining unit 11, a unique region detection result obtaining unit 12, and a display control unit 21. The biological pattern information obtaining unit 11 is hereinbelow also referred to as an information obtaining unit 11. The unique region detection result obtaining unit 12 is hereinbelow also referred to as a detection result obtaining unit 12.

The information obtaining unit 11 obtains biological pattern information from the outside. Biological pattern information is information showing a biological pattern. A biological pattern may be the pattern of a fingerprint (an entire fingerprint), for example.

The detection result obtaining unit 12 obtains information (unique region information) relating to a unique region of biological pattern information detected on the basis of the biological pattern information obtained by the information obtaining unit 11.

Specifically, the detection result obtaining unit 12 requests detection of a unique region by passing biological pattern information passed from the information obtaining unit 11 to a unique region detecting unit on the outside that is not illustrated. The detection result obtaining unit 12 receives information of the unique region detection result based on this request. The specific processing method for unique region detection is described below. The information of the detection result received by the unique region detection result obtaining unit includes information indicating whether there is a unique region in the passed biological pattern information and information relating to the location (coordinates and the like) when a unique region does exist.

A unique region is a region in which unique biological pattern information exists due to damage to a portion of a living body (damaged location) or a region in which biological pattern information is distorted by wrinkles or the like on the surface of a living body. In a unique region, a pattern may exist that differs from the pattern that the living body had originally. Examples of the causes of biological damage that produce a unique region include cuts and abrasions and the like, burns, and scalding from chemicals (for example, strong acid etc.).

A specific method for detecting a unique region will be described later in the second exemplary embodiment.

The display control unit 21 performs control so as to display the biological display information by giving different display attributes to a region that corresponds to a unique region and a region other than the unique region, respectively, on the basis of information about the unique region obtained by the detection result obtaining unit 12. That is, the display control unit 21 obtains information expressing whether or not a unique region is included in the biological pattern information from the detection result obtaining unit 12. When a unique region is contained in the biological pattern information, the display control unit 21 obtains position information expressing the range of the unique region from detection result obtaining unit 12. The display control unit 21 outputs a signal such as of an image, which is the result of the control, to outside. An external display unit can display an image using the signal such as of this image.

Examples of display attributes include color when displayed on a screen and the presence of flashing.

For example, the display control unit 21 performs control so as to display the unique region and the other region in different colors. In that example, the display control unit 21 performs control so as to display only the unique region in a noticeable color (for example, red), and display a region other than the unique region in an ordinary color.

In addition, for example the display control unit 21 performs control of the display so that only the unique region flashes while the region other than the unique region does not flash.

Furthermore, for example, the display control unit 21 performs control of the display so that only the colors of the unique region are inverted (that is, the luminance value is reversed for each of the primary colors, such as RGB), while the region other than the unique region is not inverted.

The display control unit 21 may be made to perform control of the display by combining two or more of the above-mentioned display attributes. As an example of that, the display control unit 21 uses a particularly noticeable color for only the unique region and displays the unique region so that it flashes.

A specific example of display control by the display control unit 21 is disclosed later in the description of a user interface.

A typical example of biological pattern information handled by the biological pattern information processing device 1 is fingerprint information. A fingerprint is a pattern formed by ridges on the surface of a hand or foot. Human skin is formed by the overlapping of the epidermis and dermis. The epidermis exists in the surface side (outer side) and the dermis exists on the back side (inner side). A layer called a papillary layer exists in the portion in contact with the epidermis and the dermis. In the vicinity of this papillary layer, irregularities exist on the dermis side, with conical portions thereof forming ridges. Sweat gland pores are arranged along the conical portions of ridges. The pattern of the ridge formed on this dermis side is seen as is at the epidermis side. Generally, this pattern is called a fingerprint. Even if the epidermis is damaged, as long as the ridge structure in the dermis is maintained, when the epidermis is reproduced, the pattern based on the ridge structure on the side of the original dermis will be reproduced at the epidermis side.

Another example of biological pattern information is the pattern of arrangement of capillary blood vessels or sweat gland pores near the surface of a finger, rather than the fingerprint itself.

Although specific methods for obtaining fingerprints are various as follows, a method may be implemented by suitably selecting from among them.

The first of the methods for obtaining a fingerprint is a method of capturing an image of the epidermis of a finger having a fingerprint with a camera and obtaining the information of that image as biological pattern information.

The second of the methods for obtaining a fingerprint is a method of obtaining the distribution of the electrical property at the surface of a finger as biological pattern information, using a sensor that comes into contact with a living body. The electrical property at the surface of a finger differs depending on the location due to for example the shape of the ridges and the presence of sweat gland pores, and it is possible to obtain a two-dimensional distribution of such features as pattern information.

The third of the methods of obtaining a fingerprint is a method that transfers a substance such as ink applied to a finger to a medium such as paper, and reads the image obtained on that medium using an optical scanner or the like.

The fourth of the methods of obtaining a fingerprint is a method that obtains the pattern of the surface of a finger (living body) using optical coherence tomography (OCT). OCT is a method of obtaining mutual interference that occurs due to the phase difference between light that is directed at a measurement target and reflected from the measurement target and a reference light, as an optical intensity pattern image. When using OCT, by suitably changing the wavelength of light, it is possible to obtain not only information of the surface of a finger but also pattern information of the interior of a living body to a certain depth from the surface (a depth of several hundred micrometers to 2000 micrometers). Thereby, it is possible to utilize not only the surface but also the living body interior pattern as biological pattern information. An example of pattern information in the interior of a living body that can be utilized is the ridge pattern in the dermis, the arrangement pattern of sweat gland pores, and the arrangement pattern of capillary blood vessels. When obtaining pattern information of the interior of a living body using OCT, for example, each strata at a predetermined depth is utilized as two-dimensional image information. Alternatively, by stacking multiple two-dimensional images of each strata, it is possible to utilize three-dimensional biological pattern information that is thereby obtained.

When three-dimensional information is not included, the fingerprint information is expressed as two-dimensional information. Also, when only the information about a certain layer is extracted from three-dimensional information, the information may be expressed as a two-dimensional image. Hereinbelow, these two-dimensional images are sometimes called "fingerprint images".

According to the biological pattern information processing device 1 described above, when biological pattern information contains a unique region, it is possible to display the unique region and another region distinguished from each other in an easy to understand manner.

Second Exemplary Embodiment

Next, the second exemplary embodiment will be described. The description that follows will focus on matter peculiar to the second exemplary embodiment, with the description of matter in common with the first exemplary embodiment being omitted.

Figure 2:
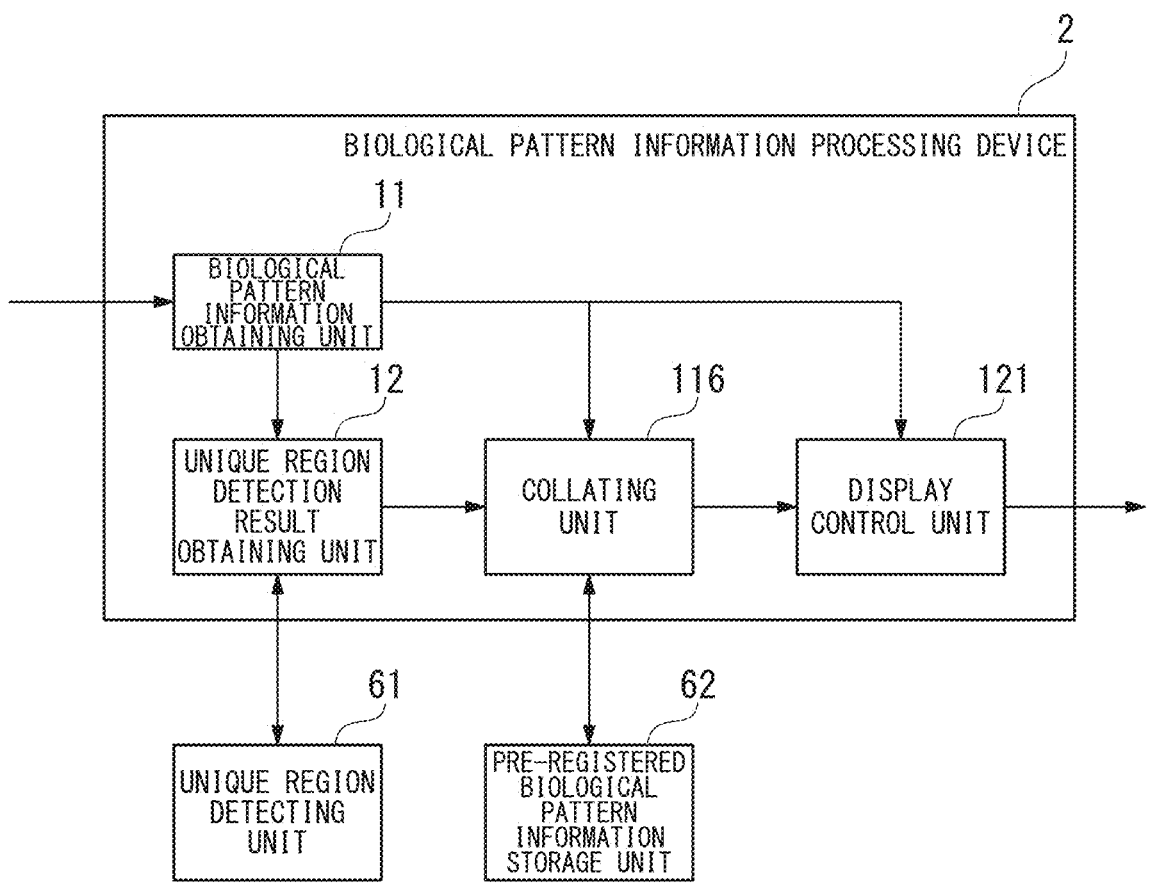
FIG. 2 is a block diagram that shows the schematic function configuration of the biological pattern information processing device according to the second exemplary embodiment.

FIG. 2 is a block diagram that shows the schematic function configuration of the biological pattern information processing device according to the second exemplary embodiment. As shown in FIG. 2, a biological pattern information processing device 2 according to this exemplary embodiment includes an information obtaining unit 11, a detection result obtaining unit 12, a collating unit 116, and a display control unit 121. In this exemplary embodiment, a unique region detecting unit 61 and a pre-registered biological pattern information storage unit 62 exist as functions external to the biological pattern information processing device 2. The functions may respectively be achieved as functions of independent devices, or may be achieved as partial functions of another device. Also, one or both of the unique region detecting unit 61 and the pre-registered biological pattern information storage unit 62 may be realized as functions in the biological pattern information processing device 2.

The information obtaining unit 11 has the same function as that in the first exemplary embodiment.

The detection result obtaining unit 12 has the same function as that in first exemplary embodiment.

The collating unit 116 performs collation processing of the biological pattern information in regions other than the unique region, and biological pattern information registered in advance in the pre-registered biological pattern information storage unit 62, among the biological pattern information obtained by the information obtaining unit 11. The collating unit 116 obtains information relating to the presence of a unique region and the position (range) of the unique region from the detection result obtaining unit 12. The collating unit 116, when performing the above-mentioned collation process, can change at least either one of a misalignment tolerance, which is the degree to which misalignment is allowed, and a mismatch tolerance, which is the degree to which non-agreement is allowed. When it is understood that there is a unique region from the information obtained by the detection result obtaining unit 12, the collating unit 16 may perform adjustment so as to change either one or both of the aforementioned tolerances so that the tolerance becomes greater (that is, so that even if there is a slight difference, the degree of regarding there to be agreement increases).

With regard to a fingerprint having damage due to an operation or injury, the region excluding the operated or injured portion (that is, the unique region) maintains the original fingerprint feature quantity. By inspecting the consistency of this portion, it is possible to perform collation with the fingerprint prior to the operation or injury. For example, in feature point collation, the determination of whether or not a fingerprint is the same is based on whether adjacent feature points of the fingerprint (end point and/or branch point of a ridge) have a definite distance difference or a definite angle difference. In the case of an operation on a fingerprint, as a result of shape change due to pulling during suturing, this tolerance often ends up being exceeded.

Therefore, with respect to a fingerprint that is determined to be a damaged fingerprint, by relaxing the misalignment tolerance and the mismatch tolerance of a fingerprint feature during collation beyond the standard values, it becomes possible to create a device characterized by being capable of performing collation with a person's finger prior to the damage.

When the collation tolerance is eased, the downside is an increased risk of a different person being mistakenly identified as the person concerned. However, regarding the final determination of whether two people are the same person, in an operational environment in which an operator separately carries out a final check using facial photographs besides fingerprints, it is possible to reduce the risk of such misidentification.

The collation process by the collating unit 116 can be performed using the prior art. The outline of the process that performs collation of fingerprints is as follows. For the collation process, the collating unit 116 extracts a feature of a fingerprint image that is input. Examples of a feature include the ridge direction of a fingerprint, a statistical value relating to the distribution of that direction, the way in which ridges are connected, the number per type of ridge singular points, the mutual positional relations of feature points, the directions of straight lines that connect a plurality of feature points, and the angle defined by those straight lines. Singular points of ridges are directional singular points called circular cores, semicircular cores and deltas. The collating unit 116 evaluates the aforementioned features in a plurality of fingerprint images in terms of their nearness and/or farness in a feature space and thereby determines whether the plurality of fingerprint images are the same or not. In one example, for a fingerprint image registered in a database in advance and a fingerprint image that has been newly input, the collating unit 116 compares the features and determines whether or not both images agree.

In such a collation process, the aforementioned position deviation tolerance is a value indicating for example the degree to which positional error of the feature point in a fingerprint image is allowed. The mismatch tolerance is a value that expresses the degree to which, when two fingerprint images to be compared do not completely match, the images are regarded as matching regardless of the extent of feature mismatch. Mismatch tolerance may for example be expressed by a distance appropriately defined in a feature space, and may be expressed by the degree of the weighting of the penalty to be given according to that distance.

The display control unit 121 has the same function as the display control unit 21 in the first exemplary embodiment. The display control unit 121 performs control to perform display according to the collation result by the collating unit 116. As an example, the display control unit 121, as a result of collation by the collating unit 116, displays a portion in which a match is seen with a special display attribute (for example, a special color).

The unique region detecting unit 61 performs processing that analyzes the biological pattern information passed from the outside, and determines whether a unique region is contained in the biological pattern information. The unique region detecting unit 61 outputs information indicating whether or not there is a unique region as a decision result. When a unique region is included in the biological pattern information, the unique region detecting unit 61 outputs information on the position (position information indicating the range of the region). Details of the determination process by the unique region detecting unit 61 will be given later.

The pre-registered biological pattern information storage unit 62 stores biological pattern information registered in advance. The pre-registered biological pattern information storage unit 62 associates and holds biological pattern information and identification information for identifying individuals. The pre-registered biological pattern information storage unit 62 may also associate and hold the above-mentioned identification information and attribute information of individuals. Examples of attribute information of an individual are a name, information of registered place of residence, and information about an individual's legal status. The pre-registered biological pattern information storage unit 62 uses for example a magnetic hard disk drive unit, semiconductor memory, and the like as a means for storing information.

(Method of Unique Region Detection Processing)

Hereinbelow, the configuration of the inside of the unique region detecting unit 61 and the method of unique region detection processing are described. Here, the target biological pattern information is information of a fingerprint image.

Figure 3:
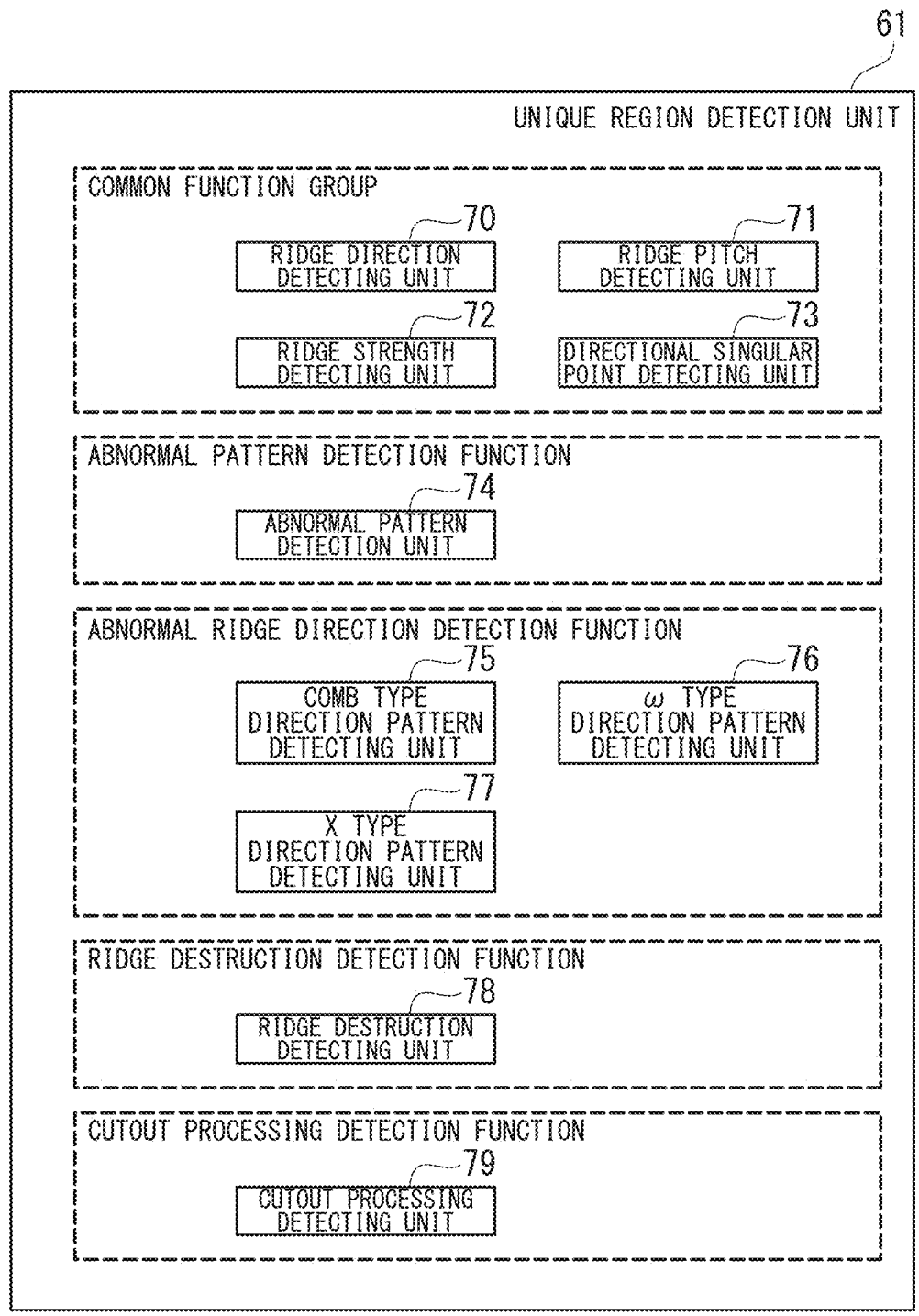
FIG. 3 is a block diagram that shows the schematic function configuration of the inner portion of the unique region detection unit according to the second exemplary embodiment.

FIG. 3 is a block diagram that shows the schematic function configuration of the inner portion of the unique region detection unit 61. As shown in FIG. 3, the unique region detecting unit 61 includes a common function group, an abnormal pattern detection function, an abnormal ridge direction detection function, a ridge destruction detection function, and a cutout processing detection function. The common function group includes a ridge direction detecting unit 70, a ridge pitch detecting unit 71, a ridge strength detecting unit 72, and a directional singular point detecting unit 73. The operation of the unique region detecting unit 61 using these functions is described below.

The unique region detecting unit 61 first receives data of a fingerprint image from the detection result obtaining unit 12.

The unique region detecting unit 61 analyzes the fingerprint image received using functions included in the common function group. Specifically, the ridge direction detecting unit 70 detects the ridge direction in a fingerprint image. The ridge pitch detecting unit 71 detects the ridge pitch in a fingerprint image. The ridge strength detecting unit 72 detects the ridge strength in a fingerprint image. The directional singular point detecting unit 73 detects the singular point in a fingerprint image. The unique region detecting unit 61 may detect only any one of ridge direction, ridge pitch, ridge strength, and singular point rather than all thereof. The processing that detects the ridge pitch, ridge strength, and singular point from a fingerprint image is a feature extraction process in general fingerprint authentication technology, and can be performed using prior art.

A ridge direction is the direction in which a ridge heads. Ridge pitch is the width between parallel ridges (the distance from one ridge to another parallel and adjacent ridge). Ridge strength is a degree expressing ridge-likeness as information obtained from an image. A singular point is a portion in a fingerprint image at which a ridge becomes discontinuous.

The unique region detecting unit 61 initially extracts ridge direction, ridge pitch, and ridge strength from the fingerprint image that has been received using the Gabor filter. Specifically, the unique region detecting unit 61, for each pixel included in the fingerprint image, applies Gabor filters with the direction and pitch changed in stages. The direction and pitch of that filter from which the highest absolute values are obtained among the Gabor filters that are applied are regarded as the direction and pitch of the ridge in that pixel. Also, the unique region detecting unit 61 extracts the absolute value of the filter application value at that time as ridge strength.

The unique region detecting unit 61 detects the singular points in a fingerprint image. Among singular points there exist a directional shape called a delta and a direction shape called a core. Among these, the core type can be further classified into a circular core and a semicircular core. A circular core is a core in which the ridges rotate 360° in the range of the singular point. A semicircular core is a core in which the ridges rotate 180° in the range of the singular point. As the method of detecting singular points, the unique region detecting unit 61 uses prior art. As an example, a method of detecting singular points is disclosed in a document [Asker Michel Bazen, "Fingerprint identification: Feature Extraction, Matching, and Database Search", Twente University Press, 2002]. The unique region detecting unit 61 stores the number of detected circular cores, semicircular cores and deltas per finger, and the position (coordinates) of each of the singular points for processing at a later stage. The unique region detecting unit 61 detects the direction of the pattern in a singular point (for example, in the case of a semicircular core, whether the side on which the ridge is open is the upper side or lower side of the finger), and stores the information for processing at a later stage.

In addition to the example of the prior art mentioned above, the unique region detecting unit 61 may also use another system. In order to improve accuracy, the unique region detecting unit 61 may jointly use a separate means for correcting extraction errors in the ridge direction and ridge pitch.

Next, the unique region detecting unit 61 performs a process for detecting four kinds of unique regions in a fingerprint image. The four kinds are (1) abnormal pattern, (2) abnormal ridge direction, (3) ridge destruction, and (4) cutout process. The characteristics of a fingerprint having these four kinds of abnormalities and methods for detection thereof are described below.

((1) Abnormal Pattern Detection)

The unique region detecting unit 61 includes an abnormal pattern detection unit 74 as a function for detecting abnormal patterns. The abnormal pattern detection unit 74 detects an abnormal pattern based on the number and spatial relationship of the singular points (delta, a semicircular core, circular core) which were detected previously. Normal fingerprint images are classified into four types of fingerprint patterns based on the pattern of the ridge direction. The four types are arch, loop, whorl, and composite. The number and positional relation of the singular points are fixed for each of the fingerprint patterns.

Specifically, in the arch pattern, the number of cores is zero and the number of deltas is also zero. That is, the curve of a ridge is smooth. In the loop pattern, the number of semicircular cores is one and the number of deltas is one or fewer. In a whorl pattern, either the number of circular cores is one and the number of deltas is two, or the number of semicircular cores is two and the number of deltas is two or fewer. In the composite, either the number of semicircular cores is three and the number of deltas is three or fewer, or there is one circular core, one semicircular core and the number of deltas is three or fewer. In the case of a normal fingerprint image, there are also predetermined restrictions on the spatial relationships of singular points.

Normal fingerprint images have the above-mentioned patterns. The abnormal pattern detecting unit 74 detects as an abnormal pattern an image with an abnormal pattern that cannot appear in a normal fingerprint image. Specifically, the unique region detecting unit 61 detects as an abnormal pattern a fingerprint image that meets any of the following conditions (A) to (F).

Condition (A): When two more circular cores exist
Condition (B): When four or more semicircular cores exist
Condition (C): When two or more cores exist and one or more circular cores exist
Condition (D): When four or more deltas exist
Condition (E): When a delta exists above a core (on the side close to the fingertip)
Condition (F): When there are two or more cores whose upper-side is semicircular That is, the unique region detecting unit 61 detects the singular points in ridges contained in a fingerprint image, and detects a unique region on the basis of the condition of the per-type number of singular points and the condition of the spatial relationship among the types of singular points.

One of the causes for an abnormal pattern to be detected in a fingerprint is a surgical procedure carried out on a finger.

Figure 4A:
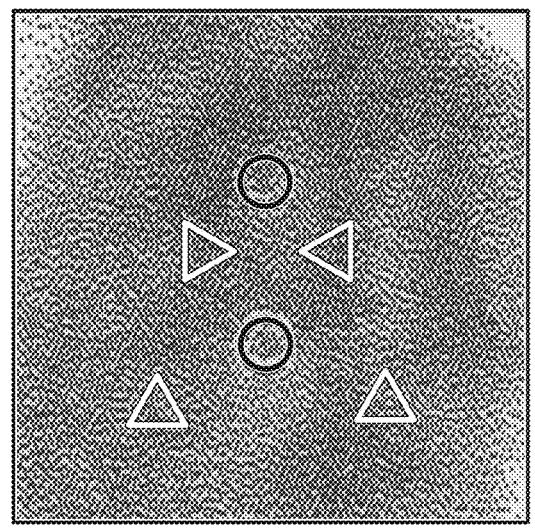
FIG. 4A is a schematic diagram that shows an example of an abnormal pattern in a fingerprint that is the object of detection by the unique region detection unit according to the second exemplary embodiment.
Figure 4B:
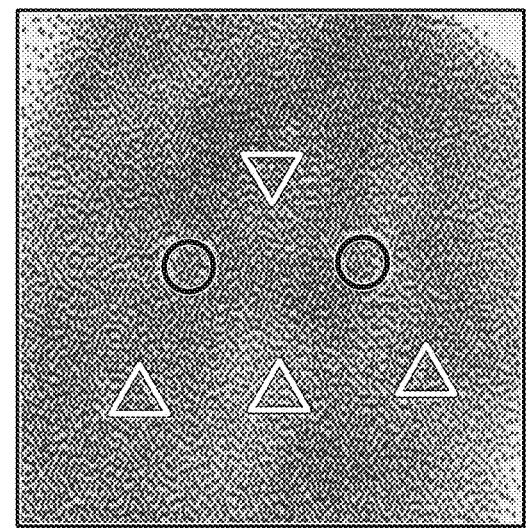
FIG. 4B is a schematic diagram that shows an example of a fingerprint image that includes an abnormal ridge direction that is the object of detection by the unique region detection unit according to the second exemplary embodiment.
Figure 4C:
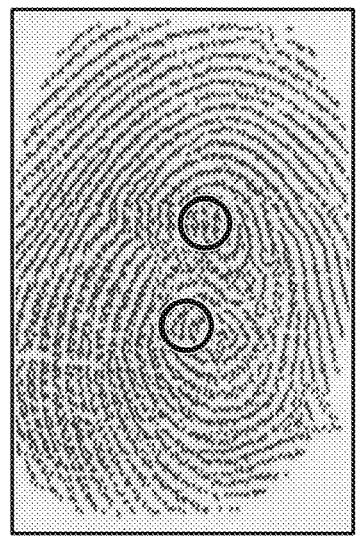
FIG. 4C is a schematic diagram that shows an example of a fingerprint image that includes an abnormal ridge direction that is the object of detection by the unique region detection unit according to the second exemplary embodiment.

FIGS. 4A to 4C show examples of abnormal patterns in fingerprints. In FIGS. 4A to 4C, the locations indicated by circles are circular cores. Also, the locations indicated by triangles are deltas. The example of the fingerprint image shown in FIG. 4A has two circular cores and four deltas. That is, this fingerprint image corresponds to the conditions of the aforementioned (A) and (D) and is determined by the abnormal pattern detecting unit 74 as having an abnormal pattern. The example of the fingerprint image shown in FIG. 4B has two circular cores and four deltas. Also, in the example of the fingerprint image shown in FIG. 4B, a delta exists above two circular cores. That is, this fingerprint image corresponds to the conditions of the aforementioned (A), (D), and (E) and is therefore determined by the abnormal pattern detecting unit 74 as having an abnormal pattern. The example of the fingerprint image shown in FIG. 4C has two circular cores. That is, this fingerprint image corresponds to the aforementioned condition (A) and is therefore determined by the abnormal pattern detecting unit 74 as having an abnormal pattern.

The abnormal pattern detecting unit 74, upon detecting an abnormal pattern, outputs the type of abnormality (any of the conditions from (A) to (F) above) and the position and type of the singular point related to that abnormality.

The abnormal pattern detecting unit 74, upon not detecting an abnormal pattern, outputs information to that effect.

((2) Abnormal Ridge Direction Detection)

The unique region detecting unit 61 detects an abnormal pattern in a ridge direction. Abnormal ridge directions also come in a number of patterns. The three typical patterns are, for convenience sake, called the comb type direction pattern, the ω type direction pattern, and the X type direction pattern. In this exemplary embodiment, the unique region detecting unit 61 detects the three types of abnormal ridge directions of the comb type direction pattern, the ω type direction pattern and the X type direction pattern. In the case of fingerprint epidermis transplant surgery having been performed, these abnormal ridge direction patterns indicate there is a possibility of the transplant being visible at the boundary of the transplanted epidermis. These patterns are not seen in normal fingerprint images.

Figure 5A:
FIG. 5A is a schematic diagram that shows an example of a fingerprint image that includes an abnormal ridge direction that is the object of detection by the unique region detection unit according to the second exemplary embodiment.
Figure 5B:
FIG. 5B is a schematic diagram that shows an example of a fingerprint image that includes an abnormal ridge direction that is the object of detection by the unique region detection unit according to the second exemplary embodiment.
Figure 5C:
FIG. 5C is a schematic diagram that shows an example of a fingerprint image that includes an abnormal ridge direction that is the object of detection by the unique region detection unit according to the second exemplary embodiment.

FIGS. 5A to 5C show examples of fingerprint images containing an abnormal ridge direction.

FIG. 5A is an example of a fingerprint image having the abnormal ridge direction called a comb type direction pattern. This comb type abnormal ridge direction is a ridge direction pattern that easily occurs near the boundary of a transplanted epidermis when an operation has been performed to cut out a fingerprint epidermis with a scalpel and then reattach the epidermis with the position changed.

FIG. 5B is an example of a fingerprint image having the abnormal ridge direction called a ω type direction pattern. This ω type abnormal ridge direction is also a ridge direction pattern that easily occurs near the boundary of a transplanted epidermis when surgery has been performed to cut out a fingerprint epidermis with a scalpel and then reattach the epidermis with the position changed. Also, this ω type direction pattern is a pattern that easily occurs when a deep wound has been inflicted with an edged tool or the like in the arch-shaped portion of a fingerprint.

FIG. 5C is an example of a fingerprint image having the abnormal ridge direction called an X type direction pattern. This X type abnormal ridge direction is a ridge direction pattern that easily occurs in a sutured portion when the skin is tightly bound with surgical thread.

Figure 6A:
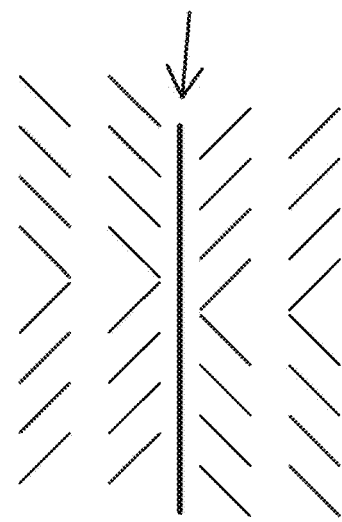
FIG. 6A is a conceptual diagram that schematically shows a template corresponding to an abnormal ridge direction pattern (X type), being a template used by the unique region detection unit according to the second exemplary embodiment.
Figure 6B:
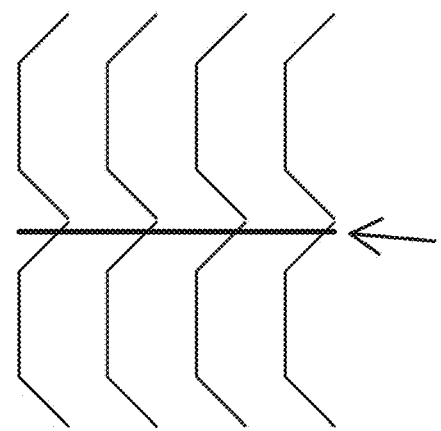
FIG. 6B is a conceptual diagram that schematically shows a template corresponding to an abnormal ridge direction pattern (ω type), being a template used by the unique region detection unit according to the second exemplary embodiment.
Figure 6C:
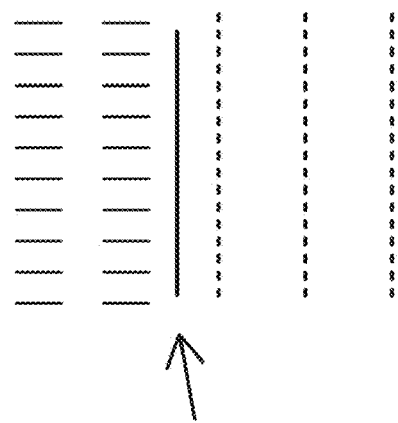
FIG. 6C is a conceptual diagram that schematically shows a template corresponding to an abnormal ridge direction pattern (comb type), being a template used by the unique region detection unit according to the second exemplary embodiment.

FIGS. 6A to 6C are conceptual diagrams that schematically show templates respectively corresponding to the abnormal ridge direction patterns (comb type, ω type, X type).

FIG. 6A corresponds to the X type direction pattern in a fingerprint image.

FIG. 6B corresponds to the ω type direction pattern in a fingerprint image.

FIG. 6C corresponds to the comb type direction pattern in a fingerprint image.

The inside of the unique region detecting unit 61 includes, in the interior thereof, a comb type direction pattern detecting unit 75, an ω type direction pattern detecting unit 76, and an X type direction pattern detecting unit 77 corresponding to each of the above-mentioned abnormal direction patterns. The unique region detecting unit 61, using the ridge direction information and ridge strength information previously detected by the aforementioned methods, performs a process for detection of these abnormal direction patterns.

Below, the process method for detection of each abnormal direction pattern is described.

The comb type direction pattern detecting unit 75, with data of the ridge direction and ridge strength detected in advance on the basis of the given fingerprint image serving as an input, calculates and outputs a degree expressing comb type direction pattern likeness of that fingerprint image.

Specifically, the comb type direction pattern detecting unit 75 beforehand holds comb type template data which expresses the direction pattern as shown in FIG. 6C in an internal memory. The comb type template data is data obtained on the basis of fingerprint images having comb type direction patterns, and is stored in a two-dimensional array corresponding to a polar coordinate system. The "i" that is the first coordinate of the comb type template data Tk(i, j), which is a two-dimensional array, corresponds to the displacement angle about the center of the template data. "i=1, 2, . . . M" is satisfied. This "i" is an index value corresponding to each direction when 360°, or all directions from the center of the fingerprint image, in graduated in (360/M°). With the positive direction of the X axis in the XY orthogonal coordinate system being 0°, the counterclockwise direction is the positive direction of the displacement angle. Also, the "j", which is the second index, corresponds to the distance from the center of the fingerprint image. "j=1, 2, . . . , N" is satisfied This "j" is an index value corresponding to the distance from the center of the template. The value of each element of Tk(i, j) is a two-dimensional vector (unit vector) value expressing the ridge direction at the portion (small region) represented by this polar coordinate.

The comb type direction pattern detecting unit 75, while changing "t", which is the rotation angle of the template with respect to an arbitrary pixel position (x, y) in a given fingerprint image, calculates the largest value of the sum of the inner products of the direction vectors of the ridge direction within a circle of the image. The maximum value is given by Ek(x, y) with the following equation.

$$Ek(x, y) = \max_{t=1,...,M} \left\{ \sum_{i=1}^{N} \frac{Tk(r, i) \cdot Id(x + dx(i), y + dy(i))}{N} \right\} \quad \text{(Equation 1)}$$

In equation (1) above, Id(x, y) is the unit vector expressing the ridge direction at coordinate (x, y) in a fingerprint image. Tk(t, i) is the i-th direction (with rotation angle t) of the comb type template. dx(i) is the x coordinate displacement of the i-th element in the template. dy(i) is the y coordinate displacement of the i-th element in the template.

That is, when the template is rotated 360° at coordinate (x, y) of the fingerprint image, the value of Ek(x, y) calculated by equation (1) is the correlating value when the correlation between the fingerprint image and the template is greatest (that is, when t corresponds to such an angle).

Also, the ridge direction (displacement angle) is expressed as a numerical value in a range up to 180° counterclockwise, with the positive direction of the X axis being 0°. However, since it is necessary to regard 0° and 180° as essentially being the same direction, the inner product is taken after changing the angle of the direction vector so that the angle with the X axis positive direction (0° direction) is doubled.

The value of Ek(x, y) calculated in equation (1) above is an indicator expressing the directional consistency between the fingerprint image and the template. Moreover, the comb type direction pattern detecting unit 75 calculates the comb type evaluation value Wk(x, y) by multiplying by the ridge strength. The ridge strength expresses the fingerprint-likeness.

$$Wk(x,y) = \max(0, Ek(x,y) - C) \times Is(x,y) \quad \text{(Equation 2)}$$

In the above equation, C is a threshold value that is appropriately set. That is, the threshold value C has the action of removing as noise the portion in which the value of Ek(x, y) is equal to or less than C. Is(x, y) is the average value of the ridge strength in the same radius as the template, centered on the coordinates (x, y).

That is, the evaluation value Wk(x, y) is a value found by subtracting the threshold value C from the value of Ek(x, y) (whose result becomes zero when negative), and multiplying the difference by the ridge strength in the vicinity of the coordinates (x, y).

The comb type direction pattern detecting unit 75 outputs the value of this Wk(x, y) that has been calculated as a comb type abnormality degree. This comb type abnormality degree is a degree that expresses the comb type direction pattern-likeness.

The ω type direction pattern detecting unit 76 beforehand holds ω type template data which expresses the direction pattern as shown in FIG. 6B in an internal memory. The data structure of the ω type template data is the same as the comb type template data. The ω type template data is template data that expresses a ridge direction, and is created in advance based on fingerprint images having an actual ω type direction pattern. The ω type direction pattern detecting unit 76, using the same procedure as the calculation procedure of the comb type direction pattern detecting unit 75 described above, calculates the ω type abnormality degree Wo(x, y) on the basis of a given fingerprint image and the aforementioned ω type template data.

The X-type direction pattern detecting unit 77 beforehand holds X-type template data which expresses the direction pattern as shown in FIG. 6A in an internal memory. The data structure of the X-type template data is the same as the comb type template data. The X-type template data is template data that expresses a ridge direction, and is created in advance based on fingerprint images having an actual X-type direction pattern. The X-type direction pattern detecting unit 77, using the same procedure as the calculation procedure of the comb type direction pattern detecting unit 75 described above, calculates the X-type abnormality degree Wx(x, y) on the basis of a given fingerprint image and the aforementioned X-type template data.

The unique region detecting unit 61 determines whether the fingerprint image is an abnormal ridge direction fingerprint by whether the respective maximum values of the comb type abnormality degree Wk(x, y) output by the comb type direction pattern detecting unit 75, the ω type abnormality degree Wo(x, y) output by the ω type direction pattern detecting unit 76, and the X-type abnormality degree Wx(x, y) output by the X-type direction pattern detecting unit 77 exceed the predetermined threshold value. When the value exceeds the threshold value, the unique region detecting unit 61 determines that the fingerprint image is an abnormal ridge direction fingerprint (that is, the comb type direction pattern, the ω type direction pattern, or the X-type direction pattern). Otherwise, the fingerprint image is determined to not be an abnormal ridge direction fingerprint.

As another method, the unique region detecting unit 61 may determine whether the fingerprint image is an abnormal ridge direction fingerprint by whether the sum of each maximum value of the comb type abnormality degree Wk(x, y) output by the comb type direction pattern detecting unit 75, the ω type abnormality degree Wo(x, y) output by the ω type direction pattern detecting unit 76, and the X-type abnormality degree Wx(x, y) output by the X-type direction pattern detecting unit 77 exceeds a predetermined threshold value. When that value exceeds the threshold value, the unique region detecting unit 61 determines the fingerprint image to be an abnormal ridge direction fingerprint. Otherwise, the unique region detecting unit 61 determines the fingerprint image to not be an abnormal ridge direction fingerprint.

That is, the unique region detecting unit 61 obtains the ridge direction information for every part contained in a fingerprint image. The unique region detecting unit 61 finds an evaluation value showing the degree to which the ridge direction information has an abnormal ridge direction pattern based on the correlation between the ridge direction information and templates of the abnormal ridge direction patterns stored in advance (the comb type direction pattern, the ω type direction pattern, and the X-type direction pattern). Moreover, the unique region detecting unit 61 detects as a unique region a portion corresponding to the ridge direction information when that evaluation value is equal to or greater than the predetermined threshold value.

The unique region detecting unit 61, upon determining the fingerprint image to be an abnormal ridge direction fingerprint, outputs information of the position of that unique region.

On the basis of an actual fingerprint database, weighting may also be performed in a probability distribution of the aforementioned evaluation values (comb type abnormality degree, ω type abnormality degree, and X-type abnormality degree). Thereby, it is possible to further increase the determination accuracy by the unique region detecting unit 61.

In the present exemplary embodiment, the unique region detecting unit 61 includes, in the interior thereof, the comb type direction pattern detecting unit 75, the ω type direction pattern detecting unit 76, and the X-type direction pattern detecting unit 77, and detects abnormal ridge directions respectively corresponding thereto, but is not limited to such a constitution. A configuration is also possible in which some of these units are omitted.

Conversely, the unique region detecting unit 61 may include additional direction pattern templates, and thereby detect abnormal ridge directions other than these three types. As one example, a configuration that can detect patterns in which the angle of the comb type, ω type and X type is slightly changed, and a configuration can detect several types of patterns by changing the radius of the template are possible.

The method of detecting a unique region on the basis of the number of singular points and the positional relation between the singular points described in "(1) Abnormal pattern detection" above is a valid method when a clear image of the overall fingerprint is obtained. In contrast, the method that uses an evaluation value based on a template ((2) Abnormal ridge direction detection) has the advantage of detection of an abnormal fingerprint with a specific shape being possible even when only a partial image of a fingerprint is obtained.

((3) Ridge Destruction Detection)

The unique region detecting unit 61 also has a function to detect destruction of ridges in a fingerprint. Specifically, the unique region detecting unit 61 includes, in the interior thereof, a ridge destruction detecting unit 78. The unique region detecting unit 61 performs processing for detecting each of these abnormal direction patterns using ridge direction information and ridge strength information already detected by the aforementioned methods.

Figure 7:
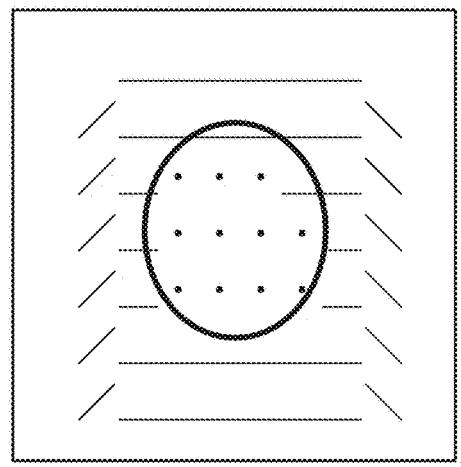
FIG. 7 is a schematic diagram that conceptually shows an example of a fingerprint image including ridge destruction that is the object of detection by the unique region detection unit according to the second exemplary embodiment.

FIG. 7 is an example that conceptually shows a fingerprint image including ridge destruction. In the example of a fingerprint image shown in FIG. 7, some of the originally continuous ridges are discontinuous, with a pattern of dots existing at that portion. In FIG. 7, the portion indicated by the elliptical frame is a portion that includes ridge destruction. Such ridge destruction may be produced from a burn or damage from a chemical agent.

The ridge destruction detecting unit 78 obtains data of the ridge direction image obtained by the aforementioned method. The data of this ridge direction image contains data of the ridge direction in each pixel. The ridge destruction detecting unit 78 performs a directional smoothing process over a large area. This directional smoothing process is a process that corrects a portion in a fingerprint image including a ridge direction incorrectly detected due to reasons such as noise to the correct ridge direction. The directional smoothing process itself is realizable with statistical processing on pixel values of ridge direction image data. A directional smoothing process is for example a process that takes the most frequent value of a directional component of a region within a definite range or takes the average of direction vectors of a region within a definite range.

Figure 8:
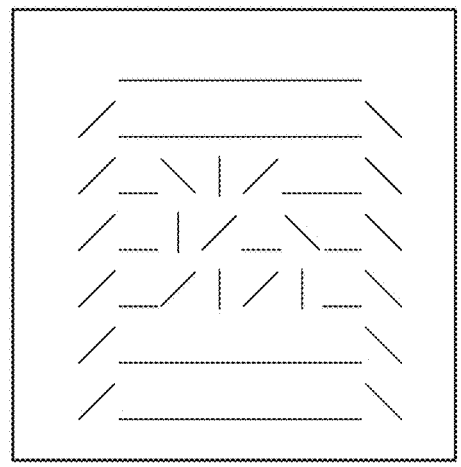
FIG. 8 is a schematic diagram that schematically shows ridge direction image data prior to the directional smoothing process, being a diagram that describes the directional smoothing process performed in the inner portion of the unique region detection unit according to the second exemplary embodiment.
Figure 9:
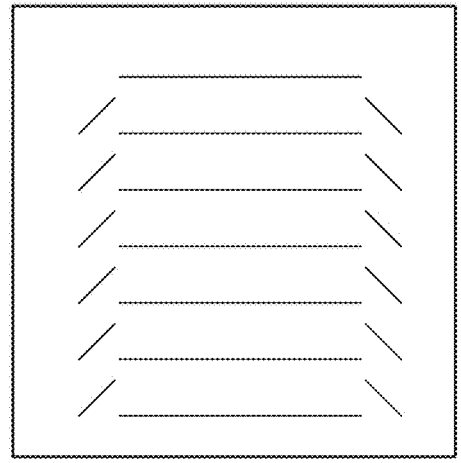
FIG. 9 is a schematic diagram that schematically shows ridge direction image data after the directional smoothing process, being a diagram that describes the directional smoothing process performed in the inner portion of the unique region detection unit according to the second exemplary embodiment.

FIG. 8 and FIG. 9 are schematic diagrams for showing actual examples of the aforementioned directional smoothing process. FIG. 8 is ridge direction image data obtained for the example of the fingerprint image of FIG. 7. In FIG. 7, the ridge directions are in a discontinuous state at the portion where the ridges are destroyed. Ridge direction image data for such a portion is easily influenced by noise. This is because the directions of the detected ridges are not stabilized. Therefore, in the center portion of FIG. 8, the ridge directions are not constant but rather random. FIG. 9 is an image of the result of performing the directional smoothing process on the ridge direction image of FIG. 8. The ridge destruction detecting unit 78, by performing a directional smoothing process over a large area, can obtain a direction image shown in FIG. 9 that smoothly changes.

The ridge destruction detecting unit 78 finds the angle difference between an initial ridge direction and the ridge direction after smoothing for every part within a direction image. When the angle (direction) has changed by a predetermined amount or more, that is, when the absolute value of the angle difference is a predetermined amount or more, the ridge destruction detecting unit 78 extracts this portion as a ridge destruction candidate region. Portions other than the ridge destruction marks due to burns or chemicals may be extracted as ridge destruction candidate regions. For example, portions such as wrinkles and blemishes of seniors fall under this type. These wrinkles and blemishes, unlike portions of burn and chemical scars, have a fine linear shape. Therefore, the ridge destruction detecting unit 78 repeats image processing called expansion and contraction on the ridge destruction candidate region extracted above to perform removal of such linear (or point-like) detailed marks.

Finally, the ridge destruction detecting unit 78 finds and outputs an evaluation value for ridge destruction detection by calculating the total of ridge strengths already obtained by the aforedescribed processing for this ridge destruction candidate region. The unique region detecting unit 61 determines the fingerprint to be one having ridge destruction marks when the evaluation value of the ridge destruction output by the ridge destruction detecting unit 78 is equal to or greater than a predetermined threshold. In other cases, the unique region detecting unit 61 determines the fingerprint to be a fingerprint without ridge destruction marks.

That is, the unique region detecting unit 61 obtains the ridge direction information of every portion contained in a fingerprint image. The unique region detecting unit 61 also obtains smoothed ridge direction information by performing the directional smoothing process based on the ridge direction information of surrounding portions of that portion for each part of the ridge direction information. When the (absolute value of the) difference between the ridge direction information and the smoothed ridge direction information is larger than a predetermined threshold, the unique region detecting unit 61 detects the region corresponding to that portion as a unique region.

The unique region detecting unit 61, upon determining that the fingerprint is one with a ridge destruction mark, outputs information on the position of that unique region.

There are not only cases of ridge destruction due to burns or chemicals, but also cases of ridge destruction due to aging deterioration over many years and being engaged in physical work involving the hands. In the case of such natural destruction, all the ridges of a finger are destroyed, not just a specified portion. In order to distinguish between such natural destruction on all regions and partial destruction due to burns and chemicals (including intentional destruction), the unique region detecting unit 61 may determine whether or not a fingerprint portion other than the ridge destruction candidate region has an image of high-quality ridges. Thereby, it is possible to detect only ridge destruction by the specified condition.

The unique region detecting unit 61 may simultaneously determine whether or not a ridge destruction mark exists in the fingerprint center portion. Since the fingerprint center portion is a portion having a large influence on the determination in fingerprint collation, ridge destruction is sometimes performed intentionally. Thereby, it is possible to detect only ridge destruction of a specific location.

((4) Cutout Processing Detection)

The unique region detecting unit 61 also has a function to detect cutout processing of a fingerprint. Specifically, the unique region detecting unit 61 includes a cutout processing detecting unit 79. The cutout processing detecting unit 79 determines the existence of a cutout process in relation to the input fingerprint image on the basis of a change in the ridge pitch (ridge interval), as described below. This is because, in the case of a fingerprint that has been subjected to a cutout process from an operation, due to suturing while pulling the skin around the surgical wound, the pitch of ridges at a specific region and the pitch of ridges in a specific direction may change locally.

Figure 10:
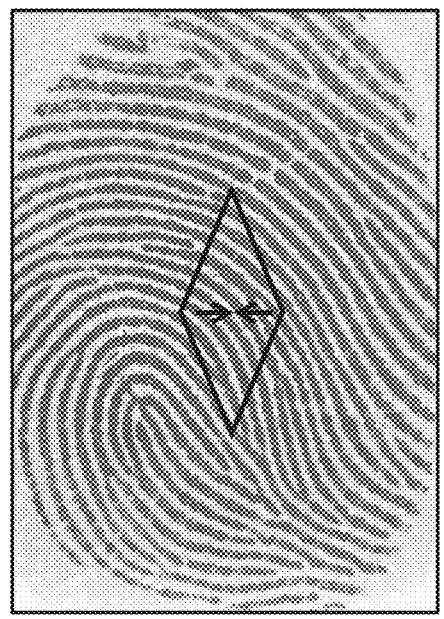
FIG. 10 is a schematic diagram for describing the process of cutting a fingerprint that is the subject of detection by the unique region detection unit according to the second exemplary embodiment, being a diagram that shows the state before the cutting process.
Figure 11:
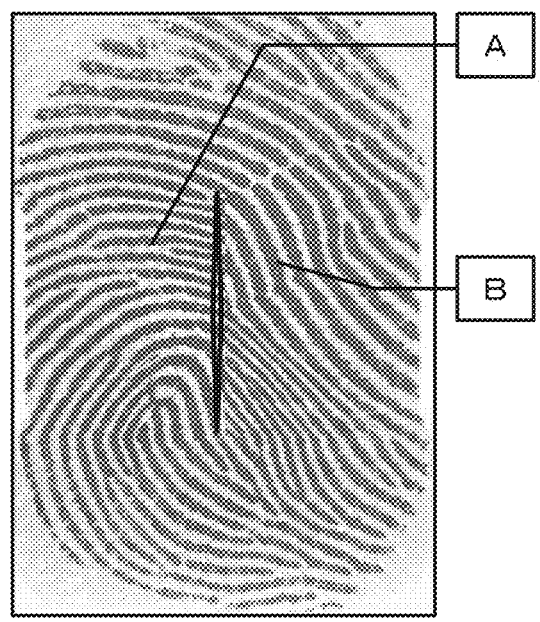
FIG. 11 is a schematic diagram for describing the process of cutting a fingerprint that is the subject of detection by the unique region detection unit according to the second exemplary embodiment, being a diagram that shows the state after to the cutting process.

FIG. 10 and FIG. 11 are schematic diagrams for describing the cutout process of a fingerprint. FIG. 10 shows an example of a fingerprint image prior to a cutout process. FIG. 11 shows an example of a fingerprint image after a cutout process in relation to the fingerprint shown in FIG. 10. One example of a cutout process by means of an operation is a method that entails applying a scalpel at the portion indicated by a diamond shape in the center of the fingerprint of FIG. 10, cutting out the inner epidermis, and suturing the diamond-shaped central portion while pulling the skin laterally, that is, in the horizontal direction so as to close the diamond shape that has been cut out.

In the case of having carried out a cutout operation that alters the fingerprint in the manner of FIG. 11, with regard to the ridges on the left side of FIG. 11 in a direction perpendicular to the cutout direction (that is, in the present example, the ridges running in the horizontal direction, the portion denoted by "A" in FIG. 11), the ridge pitch does not change as a result of the pulling. On the other hand, as for the ridges on the right side of FIG. 11 in a direction parallel with the cutout direction (that is, in the present example, the ridges running in the vertical direction, the portion denoted by "B" in FIG. 11), the characteristic is observed of the ridge pitch becoming wider than the original pitch.

The method of the detection process by the cutout processing detecting unit 79 is as follows.

The cutout processing detecting unit 79 first detects the position of a wound resulting from a cutout process. Specifically, a line segment of a definite length is generated at an arbitrary angle from an arbitrary pixel in an image, and in an image portion of a fixed-distance range (1 to 16 pixel portion) from line segments on both sides of that line segment, the ridge direction difference and ridge pitch difference are added together. The coordinates (x, y) and angle (t) where that addition value becomes a maximum is made a candidate of the wound position.

Next, the cutout process detecting unit 79 calculates two types of cutout process evaluation values with respect to a rectangular region of a predetermined side on both sides of the wound (that is, region R1 and region R2, respectively). The first evaluation value Wc1 is an index for checking whether or not the ridge pitch in the same direction as the wound is wider. The second evaluation value Wc2 is an index for checking whether or not the ridge pitches on both sides of the wound differ. The cutout process detecting unit 79 calculates Wc1 and Wc2 by the following equations.

$$Wc1 = \max_{R=R1,R2} \left\{ \left( \frac{90 - \text{angle difference between average direction in } R \text{ and } t}{90} \right) \times \max\left(0, \frac{\text{average pitch in } R - \text{fingerprint average pitch}}{\text{fingerprint average pitch}}\right) \times \text{average strength in } R \right\}$$

(Equation 3)

$$Wc2 = \frac{|\text{average pitch in } R1 - \text{average pitch in } R2|}{\text{fingerprint average pitch}} \times \quad \text{(Equation 4)}$$

$$\min(\text{average strength in } R1, \text{average strength in } R2)$$

That is, the evaluation value Wc1 is, in relation to each of regions R1 and R2, the product of the degree in which the ridge direction in the region matches "t", the degree to which the ridge pitch in the region is wider than the ridge pitch of the entire fingerprint (being 0 when narrower than the ridge pitch of the entire fingerprint), and the ridge strength in the region, and is the greater of the two (the value relating to region R1 or the value relating to region R2).

Also, the evaluation value Wc2 is the product of the degree to which the difference between the ridge pitches of regions R1 and R2 is large and the ridge strength (smaller one of the strengths of regions R1 and R2).

The average direction in the above equation is calculated by taking a weighted mean using a weighting by ridge strength generated by the ridge strength detecting unit 72, in relation to direction data generated by the ridge direction detecting unit 70. The average pitch in the above equation is calculated by taking a weighted mean using a weighting by ridge strength generated by the ridge strength detecting unit 72, in relation to pitch data generated by the ridge pitch detecting unit 71.

The determination by the evaluation values Wc1 and Wc2 calculated by the cutout process detecting unit 79 is valid when the wound position is correctly detected. However, depending on the fingerprint, cases exist in which the location of the cutout process is obscure, and the wound position is not clearly known. To deal with such cases, a method is jointly used to detect whether or not an unnaturally wide pitch portion exists in the entire fingerprint, without utilizing the wound position detected by the cutout process detecting unit 79. For that reason, the following evaluation values Wc3 and Wc4 are used as indices. Evaluation value Wc3 is an index for checking whether or not an abnormally wide pitch portion exists. Evaluation value Wc4 is an index for checking whether the pitch in a specific direction is widened. The cutout process detecting unit 79 calculates Wc3 and Wc4 by the following equations.

$$Wc3 = \frac{\text{sum total of ridge strengths which is 1.5 times or more } \textit{fingerpring} \text{ average pitch}}{\text{sum total of ridge strength of entire fingerprint}} \quad \text{(Equation 5)}$$

$$Wc4 = \frac{\text{average pitch in direction } Dm \times \text{average strength in direction } Dm}{\text{average pitch} \times \text{average strength}} \quad \text{(Equation 6)}$$

In the equation for Wc4, Dm is a direction in which the average pitch becomes a maximum.

That is, the evaluation value Wc3 is a ratio value that expresses the ratio of locations with a wide ridge pitch in the entire fingerprint (with 1.5 times the average pitch in the entire fingerprint being the basis) and takes into consideration the ridge strength.

The evaluation value Wc4 is a ratio value that expresses the ratio of pitch width in a specified ridge direction (the direction in which the average pitch becomes a maximum) in the entire fingerprint and takes into consideration the ridge strength.

Finally, the cutout process detecting unit 79 outputs the four kinds of evaluation values Wc1, Wc2, Wc3, Wc4 described above. The unique region detecting unit 61 determines whether or not a cutout process is included in the fingerprint image depending on whether or not the respective values of these evaluation values Wc1, Wc2, Wc3, Wc4 are equal to or greater than predetermined threshold values. The unique region detecting unit 61 multiples each of these evaluation values Wc1, Wc2, Wc3, Wc4 by a predetermined weighting to find a weighted average, and depending on whether or not that weighted average value is equal to or greater than a predetermined threshold value, may determine whether a cutout process is included in the fingerprint image.

That is, the unique region detecting unit 61 obtains ridge direction information and ridge pitch information for each portion included in the fingerprint image. The unique region detecting unit 61, on the basis of the ridge direction information and ridge pitch information, finds an evaluation value that becomes a greater value the more the ridge direction difference and the ridge pitch difference between adjacent regions in the fingerprint image increase. Moreover, the unique region detecting unit 61 detects adjacent regions as being a unique region due to a cutout process when the evaluation value is greater than a predetermined threshold.

The unique region detecting unit 61, upon determining the fingerprint to be one having a cutout process, outputs information of the position of that unique region.

Generally, in a normal fingerprint, the ridge pitch in the horizontal direction (shortwise direction a finger) near the distal interphalangeal joint at the bottom of a fingerprint exhibits a tendency to be wider than the ridge pitch in other regions. Based on this, in the aforementioned process, the region in which the ridges are horizontal at the bottom of a fingerprint may be excluded from the calculation of the aforementioned evaluation values Wc1, Wc2, Wc3, Wc4. By the cutout process detecting unit 79 calculating the evaluation values in this way, it is possible to further raise the determination accuracy.

In cases in which people who have had their fingerprints extracted do not desire personal authentication, sometimes they make a fingerprint while intentionally twisting their fingerprint. In such cases, due to the pulling that results from the twisting action, a tendency is observed for the pitch in a specified region and a specified direction of the fingerprint to widen. The evaluation values Wc3 and Wc4, which do not use a wound location, can also be used for the purpose of detecting a fingerprint pressed in a state not suited to authentication due to a twisting action or the like.

With the configuration of the second exemplary embodiment, the biological pattern information processing device 2, on the basis of information obtained by the detection result obtaining unit 12, can perform a collation process in accordance with the presence of a unique region. Also, it is possible to perform a collation process in accordance with the position of a unique region.

(Modification)

As a modification of the second exemplary embodiment, the display control unit 121 performs control so as to display the type of the unique region in accordance with information on the unique region that has been received. The type of a unique region means for example the type of abnormality such as an abnormal pattern, an abnormal ridge direction, ridge destruction, a cutout process described above. Specifically, the display control unit 121 according to this modification displays, as added information, information on the type of damage (pattern information) near a region that displays a fingerprint image. As an example, the display control unit 121 displays a callout arrow at the location of a unique region detected in a fingerprint image, and displays in the callout text indicating the type of damage. In another example, the display control unit 121 displays a mark or icon indicating the type of damage marks at the location of a unique region detected in a fingerprint image.

With the configuration such as this modification, a user visually confirming an actual fingerprint image can find out what pattern the unique region has. Accordingly, misunderstandings on the part of the user have less of a tendency to occur.

Third Exemplary Embodiment

Next, the third exemplary embodiment will be described. The description that follows will focus on matter peculiar to the third exemplary embodiment, with the description of matter in common with the preceding exemplary embodiments being omitted.

Figure 12:
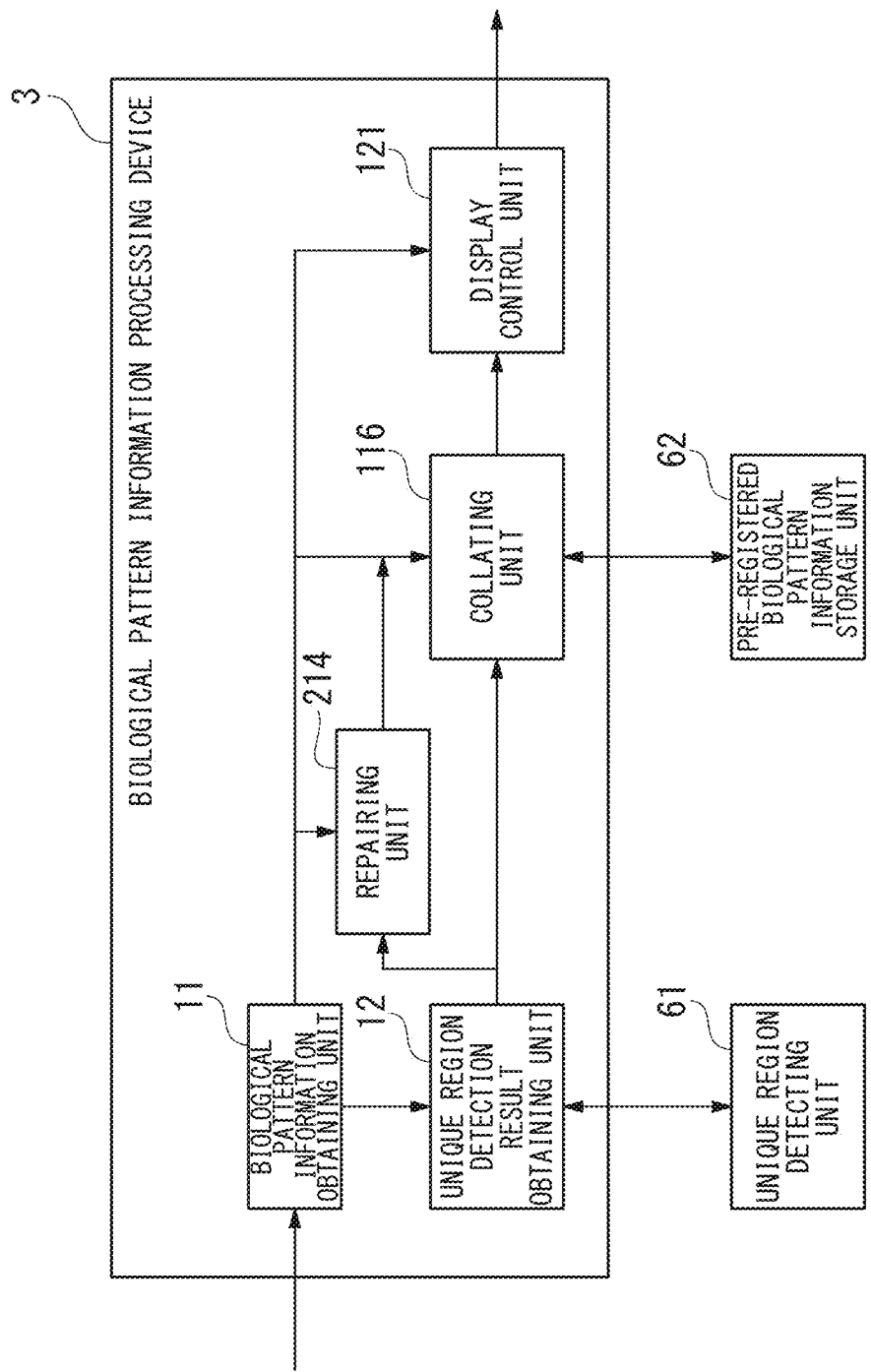
FIG. 12 is a block diagram that shows the schematic function configuration of the biological pattern information processing device according to the third exemplary embodiment.

FIG. 12 is a block diagram that shows the schematic function configuration of the biological pattern information processing device according to the third exemplary embodiment. As shown in FIG. 12, the biological pattern information processing device 3 according to the third exemplary embodiment includes the biological pattern information obtaining unit 11, the detection result obtaining unit 12, a repairing unit 214, the collating unit 116, and the display control unit 121.

The biological pattern information obtaining unit 11, the detection result obtaining unit 12, a repairing unit 214, the collating unit 116, and the display control unit 121 have the same functions as each corresponding function in the first and second exemplary embodiments. The characteristic of the biological pattern information processing device 3 according to the third exemplary embodiment is the point of including the repairing unit 214.

The repairing unit 214, for biological pattern information included in a unique region of biological pattern information obtained by the information obtaining unit 11, repairs damage of the biological information that has occurred at that unique region. The collating unit 116 in the present exemplary embodiment then performs a collation process treating the biological pattern information repaired by the repairing unit 214 as a region other than a unique region.

Next, the process by the repairing unit 214 will be described. The repairing unit 214 performs a process of repairing a fingerprint with a unique region produced by an operation called "Z-plasty". Z-plasty is surgical technique in which a scalpel cuts a Z shape in the epidermis of a fingerprint, and the two triangular portions of skin that are produced by the Z-shaped incision are swapped and sutured. Since positional change of a fingerprint feature quantity occurs when this kind of surgery is performed, collation as is with the fingerprint prior to surgery is difficult or impossible.

Figure 13:
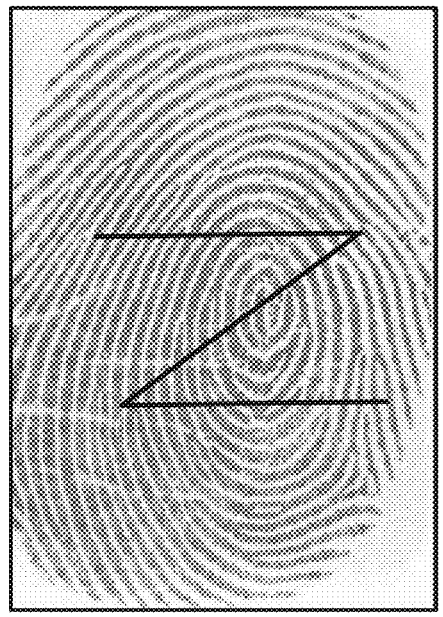
FIG. 13 is a schematic diagram for describing a Z-plasty operation that is the subject of detection by the unique region detection unit according to the third exemplary embodiment, showing an example of a fingerprint image before execution of a Z-plasty operation.
Figure 14:
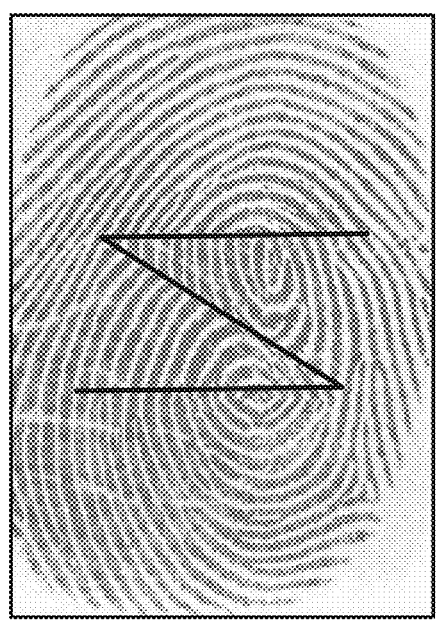
FIG. 14 is a schematic diagram for describing a Z-plasty operation that is the subject of detection by the unique region detection unit according to the third exemplary embodiment, showing an example of a fingerprint image after execution of a Z-plasty operation.

FIG. 13 and FIG. 14 are schematic diagrams that show examples of a fingerprint image for describing a Z-plasty operation. FIG. 13 shows an image before execution of a Z-plasty operation. FIG. 14 shows an image after execution of a Z-plasty operation. As described above, due to the swapping and suturing of the two triangular skin portions produced by the Z-shaped incision, the fingerprint image shown in FIG. 14 has a pattern that is ordinarily impossible.

The fingerprint image shown in FIG. 14 is an abnormal fingerprint. The repairing unit 214 performs a process that repairs a fingerprint image as shown in FIG. 14 produced by Z-plasty, that is, performs a process on the image, and performs a process for returning the image to the original (pre-operation) fingerprint image shown in FIG. 13.

Figure 15:
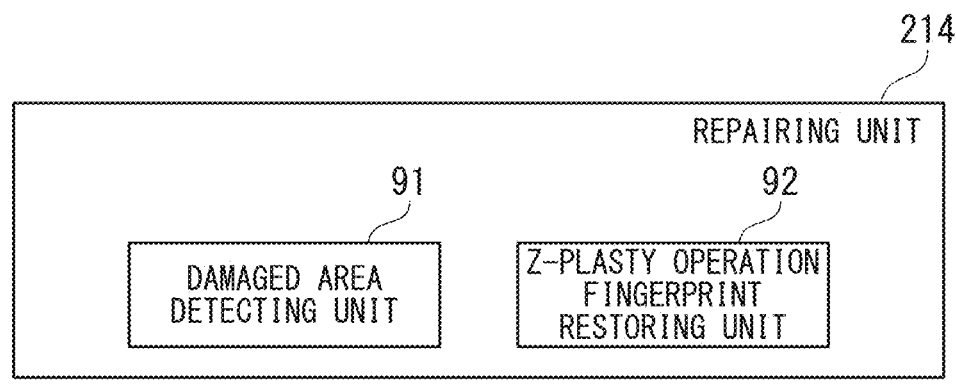
FIG. 15 is a block diagram that shows the schematic function configuration of the inner portion of a repairing unit according to the third exemplary embodiment.

FIG. 15 is a block diagram that shows the schematic function configuration of the interior of a repairing unit 214. As shown in FIG. 15, the repairing unit 214 includes in the interior thereof a damaged area detecting unit 91 and a Z-plasty operation fingerprint restoring unit 92.

Hereinbelow, the method of the process by the repairing unit 214 will be described.

The damaged area detecting unit 91 detects marks resulting from an operation from the fingerprint image, and outputs an abnormality degree image expressing the abnormality as an image. As an example, the abnormality degree image expresses the abnormality in the image with gradations.

The damaged area detecting unit 91 uses as the abnormality degree any of a comb type evaluation value Wk (x, y), an ω type evaluation value Wk (x, y), or an X-type evaluation value Wk (x, y) calculated by the unique region detecting unit 61 described above. The damaged area detecting unit 91 may be configured to receive these evaluation values from the unique region detecting unit 61, or the damaged area detecting unit 91 may be configured to calculate these evaluation values by the same method. The damaged area detecting unit 91 may also use another evaluation value (for example, a value expressing the degree of direction change or pitch change described above) as the abnormality degree. The damaged area detecting unit 91 may also use as the abnormality degree a weighted average value obtained by weighting each of these evaluation values and taking an average. The damaged area detecting unit 91 then creates the abnormality degree image using any of the abnormality degrees described here.

The Z-plasty operation fingerprint restoring unit 92 receives the two images of a fingerprint image and an abnormality degree image created by the damaged area detecting unit 91 and outputs a fingerprint restoration image after the processing.

Specifically, the Z-plasty operation fingerprint restoring unit 92 first applies a half conversion to the abnormality degree image. By this half conversion, the Z-plasty operation fingerprint restoring unit 92 detects a linear component in the abnormality degree image. The Z-plasty operation fingerprint restoring unit 92 detects three linear components (a first candidate to a third candidate) in which portions with a high degree of abnormality (dark portions when the abnormality degree is represented as a greyscale image) are arranged linearly. When the three linear components of the first candidate to third candidate form the shape of a "Z", the Z-plasty operation fingerprint restoring unit 92 determines that the fingerprint is one in which Z-plasty has been applied.

The Z-plasty operation fingerprint restoring unit 92 uses the following condition (1) to condition (3) to determine whether or not the three linear components of the first component to the third component form a "Z" shape. The condition for being determined to be a "Z" shape is that all of the following conditions (1) to (3) are met. Note that in condition (1) to condition (3), the three linear components that are the first candidate to the third candidate express straight lines (line sections) A, B, C.

Condition (1): The two straight lines A and B whose mutual directions (angles) are closest are nearly parallel. Specifically, the difference in the direction of straight line A and straight line B is 15° or less, and straight line A and straight line B do not intersect within the range of the image.

Condition (2): The straight line C other than A and B intersects the straight lines A and B with a difference in direction (angle) of 20° more and 60° or less within the range of the image.

Condition (3): The average value of the pixel values in the abnormality degree image on the straight lines (linear sections) A, B, C is for each linear section (all three) equal to or greater than a predetermined threshold value.

Figure 16:
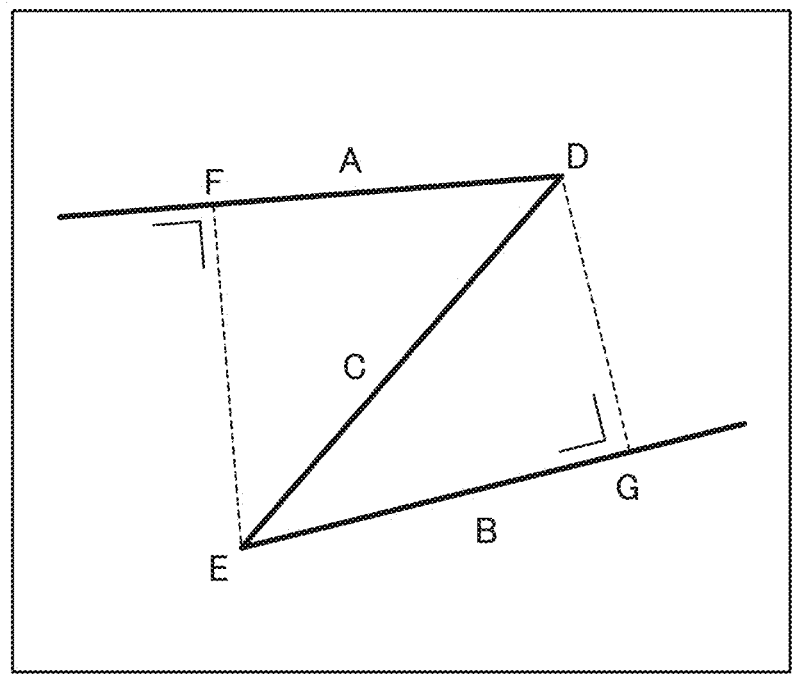
FIG. 16 is a schematic diagram that shows the method of performing a restoration process based on the image of a Z-plasty operation by the repairing unit according to the third exemplary embodiment.

FIG. 16 is a schematic diagram for describing a method of restoring a fingerprint that underwent a Z-plasty operation. In the case of an input fingerprint image being determined to be a fingerprint that underwent a Z-plasty operation, the Z-plasty operation fingerprint restoring unit 92 restores the image to the pre-operation image by the method described below (step (1) to step (6)) and outputs the obtained pre-operation image. FIG. 16 shows the three candidates (straight lines A, B, C) of linear components in the abnormal value image detected in the above determination. FIG. 16 shows points D, E, F, G used in the restoration procedure below.

Step (1): Let the intersection of straight line A and straight line B be D, and let the intersection of straight line C and straight line B be E.

Step (2): Let the foot of a perpendicular drawn from the intersection point E to straight line A (the intersection point between that perpendicular line and straight line A) be point F.

Step (3): Let the foot of a perpendicular drawn from the intersection point D to straight line B (the intersection point between that perpendicular line and straight line B) be point G.

Step (4): Copy the portion surrounded by the triangle FDE (first polygon) in the input image onto the triangle FGE of the output image by an affine transformation.

Step (5): Copy the portion surrounded by the triangle DEG (second polygon) in the input image onto the triangle DFG of the output image by an affine transformation.

Step (6): Copy as is the regions other than the portions copied in the aforementioned steps (4) and (5) from the input image to the output image.

That is, on the basis of the correlation between the ridge direction information of each portion included in the fingerprint image and a template of an abnormal ridge direction pattern held in advance, the repairing unit 214 finds for each portion an evaluation value that expresses the degree to which the ridge direction information has the abnormal ridge direction pattern, and extracts a straight line component of the evaluation value in the fingerprint image. The repairing unit 214 repairs the damage by mutually replacing the fingerprint images included in the first polygon and second polygon defined on the basis of the straight line components (however, when the shape of the replacement destination polygon differs from the original polygon shape, shape adjustment is performed by an affine transformation or the like).

It is not necessarily guaranteed that the points F and G used in the aforementioned method will completely agree with the cutout portions in an actual operation. However, the feature quantities of the fingerprint image on the triangle FGE and the triangle DFG respectively used in the steps (4) and (5) can be expected to approach the positions in the pre-operation fingerprint. That is, the possibility that collation with the pre-registered biological pattern information in the collating unit 116 will succeed increases due to this repair process by the repairing unit 214.

Also, in the case of handling an operated fingerprint in which the processed portion is clear, the repairing unit 214 may correct the coordinate position of the point F that serves as a processing start point by performing image matching (ridge matching) along the boundaries of line segment DF and line segment DE of the deformed portion. Similarly, the coordinate position of the point G that serves as a processing start point may be corrected by performing image matching along the boundaries of line segment EG and line segment ED of the deformed portion.

(Modification 1 of Repairing Unit)

The process of the repairing unit 214 may be carried out as in the following modification.

The case will be described of an input fingerprint image being determined to be one that includes cutout process damage on the basis of the evaluation values Wc1 and Wc2 calculated by the cutout processing detecting unit 79 described above. In this case, the repairing unit 214 detects a rectangular region of which the side on the wide-pitch side of the detected wound has a wide pitch, calculates the product of the width of this region and the pitch change differential within the rectangle, and estimates this to be the width of the cutout portion. Thereby, by performing image deformation so as to insert the diamond-shaped region in the center of FIG. 10 as a blank portion within the detected rectangular region of the image of FIG. 11 it is possible to restore the fingerprint periphery outside the diamond shape.

(Modification 2 of Repairing Unit)

As another modification of the repairing unit 214, a process may be carried out so as to use the repairing unit 214a described below. The repairing unit 214a of this modification does not restore a pre-operation fingerprint by deformation or the like, but rather excludes the portion of a fingerprint in which processing has been performed, extracts only the portion in which processing has not been performed, and outputs the extracted result as the restored image. That is, the repairing unit 214a cuts out the portion that has not been processed by an operation or the like.

Figure 17:
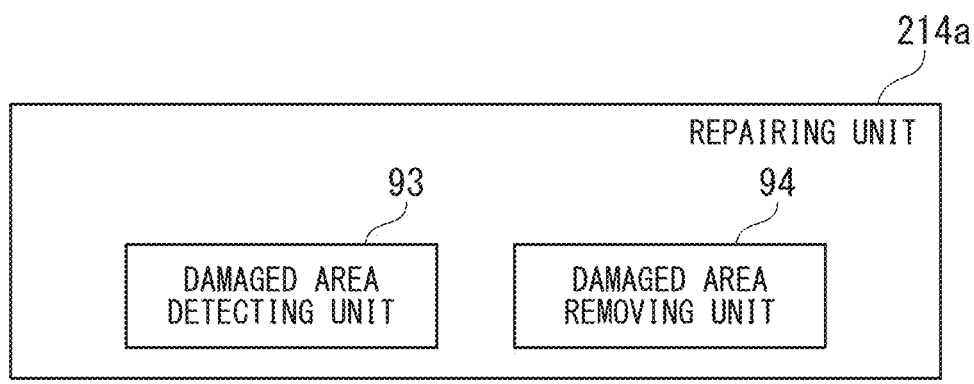
FIG. 17 is a block diagram that shows the schematic function configuration of the repairing unit a according to a modification of the third exemplary embodiment.

FIG. 17 is a block diagram that shows the schematic function configuration of the repairing unit 214a according to this modification. As shown in FIG. 17, the repairing unit 214a according to this modification includes a damaged area detecting unit 93 and a damaged area removing unit 94.

An example of the function of the damaged area detecting unit 93 is the same as the function of the damaged area detecting unit 91 described above. The damaged area detecting unit 93 may additionally include a function for detecting an abnormally wide pitch region and a function for detecting a ridge damage region (a function similar to the ridge destruction detecting unit 78). Thereby, it is possible to detect a damaged area in consideration of abnormality degree image information.

The damaged area removing unit 94 decides the exclusion region to be excluded as a damaged area by any of the methods given below (method (1) to method (4)) based on the abnormality degree image generated by the damaged area detecting unit 93. Moreover, the damaged area removing unit 94, after filling in the excluded region in the fingerprint image with the background color, outputs that image.

Method (1): A region with an abnormality degree equal to or greater than a predetermined threshold value and within 16 pixels of that vicinity (the value of "16" here may be changed to another value) are made an exclusion region.

Method (2): A region with an abnormality degree equal to or greater than a predetermined threshold value is extracted and, by expansion and contraction processing of the image, made an exclusion region including a region in an abnormal region.

Method (3): A region with an abnormality degree equal to or greater than a predetermined threshold value is made an abnormal region, and a fingerprint position separated the greatest distance from that abnormal region is detected. From that position, a region within a predetermined distance in which the ridge direction and ridge pitch continuously change (there is no abnormal discontinuity) is made the valid region. A portion other than that valid region is made the exclusion region.

Method (4): A region with an abnormality degree equal to or greater than a predetermined threshold value is made an abnormal region, and a fingerprint position separated the greatest distance from that abnormal region is detected. In a circle centered on that position, having as its radius the distance from that position to the abnormal region, the outside of the circle is made the exclusion region.

That is, the repairing unit 214a repairs damage by removing from the entire fingerprint image information of the fingerprint image belonging to the exclusion region defined on the basis of a unique region.

Whether to adopt a method from the aforementioned methods (1) to (4) can be controlled by a parameter given from outside, for example. As another example, method (4) is applied with the highest priority, and in the event that the region (width) of the fingerprint image required for the collation process is not obtained as a result, method (3) is applied, and likewise method (2) and method (1) in that order.

Although the process by the Z-plasty operation fingerprint restoring unit 92 corresponds to only fingerprints with damage due to an operation of a specific method, when surgical scars are not clearly visible, there is a possibility that restoration of the pre-operation fingerprint may not be possible. In such a case, by excluding the portion at which a fingerprint process was performed by the method using the damaged area removing unit 94, there is the advantage of being able to perform collation with the person's fingerprint prior to the process.

Also when based on this modification, the repairing unit 214a, in the sense of removing information of a damaged portion, is an example of the case of, for biological pattern information included in a unique region among biological pattern information acquired by the biological pattern information obtaining unit 11, repairing damage to the biological pattern information that occurred in the unique region.

It is not necessarily guaranteed that the process by the repairing unit 214 (or the modification thereof) (that is, the process of restoring to the pre-operation state a fingerprint that underwent a Z-plasty operation or excluding a damaged area) will accurately restore the pre-operation fingerprint. For example, it is possible that a normal fingerprint of a finger with no operation history may be judged as having undergone an operation due to an incorrect determination, and thereby end up being processed. However, it is possible to lower the risk of a drop in the authentication rate by for example the collating unit 116 collating both the fingerprint image prior to processing by the repairing unit 214 (of the modification thereof) and the post-process fingerprint image with the pre-registered biological pattern information storage unit 62. When collating both pre- and post-processing images with the pre-registered biological pattern information storage unit 62, the case of either fingerprint image matching a pre-registered biological pattern can be regarded as agreement with the pre-registered biological pattern.

As a result of the processing by the repairing unit 214 (of the modification thereof), there is the risk of the fingerprint image after the restoration process matching another person's fingerprint. However, provided the operator does not make a final judgement based solely on that match but instead performs a separate confirmation using a means other than a fingerprint (for example, a facial photograph), it is possible to lower the risk of such a mismatch with another person.

With the constitution of the third exemplary embodiment, the biological pattern information processing device 3, based information obtained by the detection result obtaining unit 12, due to the repairing unit 214 (of the modification thereof) performing repair of the biological pattern information, can perform a collation process using biological pattern information that has been repaired.

(Device User Interface)

Next, the device user interface according to each exemplary embodiment described above (the first exemplary embodiment to third exemplary embodiment, and modifications thereof) will be described.

Figure 18:
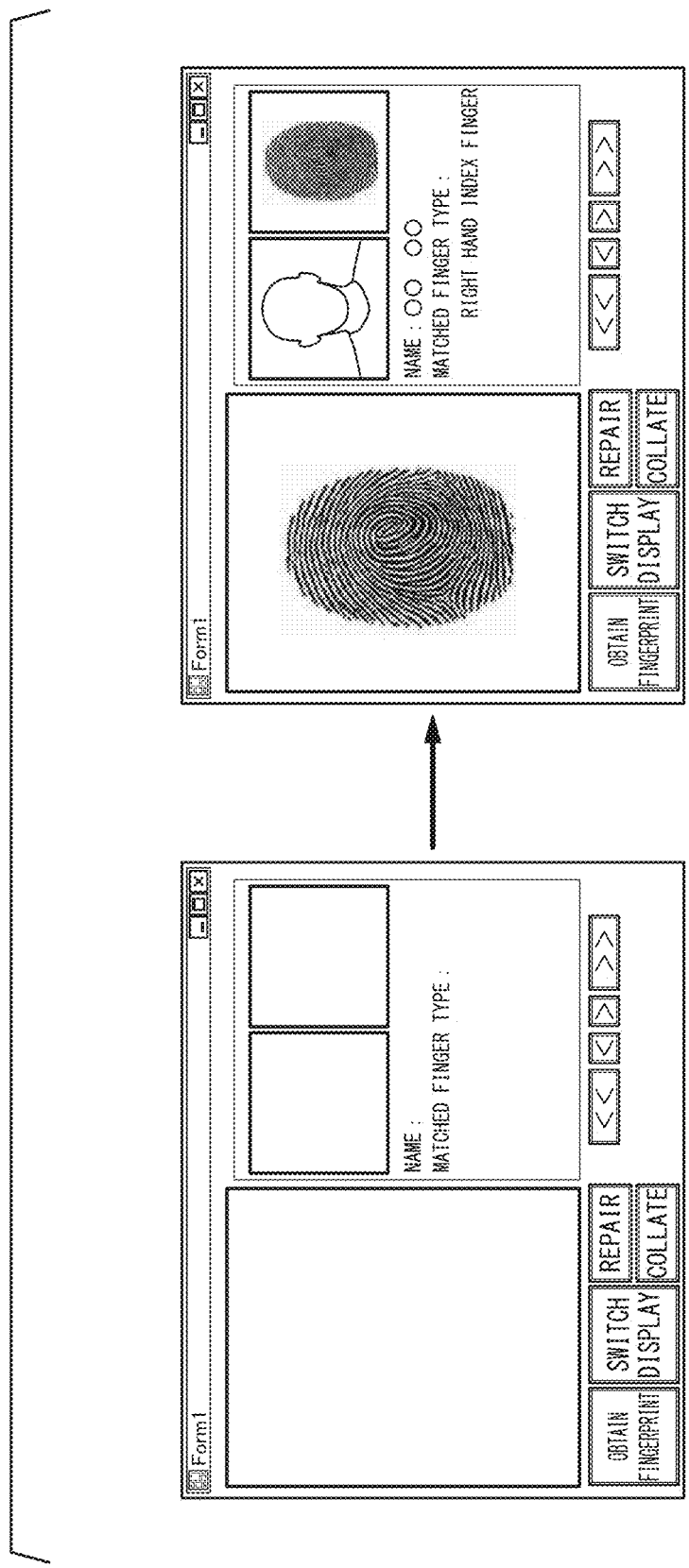
FIG. 18 is a schematic diagram that shows an example of the user interface of the device according to at least one of the first to third exemplary embodiments, relating to the process of obtaining a fingerprint image.

FIG. 18 is a schematic diagram that shows a user interface when obtaining a fingerprint image. The screen shown on the left side of FIG. 18 is the display state prior to fingerprint acquisition. This screen (window) has the buttons "Obtain Fingerprint", "Switch Display", "Repair", and "Collate". When the "Obtain Fingerprint" button is depressed by the user (specifically, when subjected to a click operation using a mouse that is a pointing device), an external fingerprint obtaining means reads a fingerprint and the fingerprint obtaining unit 11 reads that fingerprint image. As shown in the screen (window) on the right side of FIG. 18, the biological pattern information processing device (1, 2, 3) displays the read fingerprint in the region on the left side of the window. The collating unit 116 collates this fingerprint and a pre-registered fingerprint. When there is a matching fingerprint, an image of the matched fingerprint and the identification information of the person having that fingerprint (individual ID or name) are displayed in the region on the right side of this window. In FIG. 18, a facial photograph of the person corresponding to the matched fingerprint and the matched finger type ("right hand index finger") are also shown.

In the user interface described in FIG. 18, the portion relating to the collation process is not included in the first exemplary embodiment. Also, the portion relating to the process of repairing a damaged portion of biological pattern information is not included in the first exemplary embodiment and the second exemplary embodiment.

Figure 19:
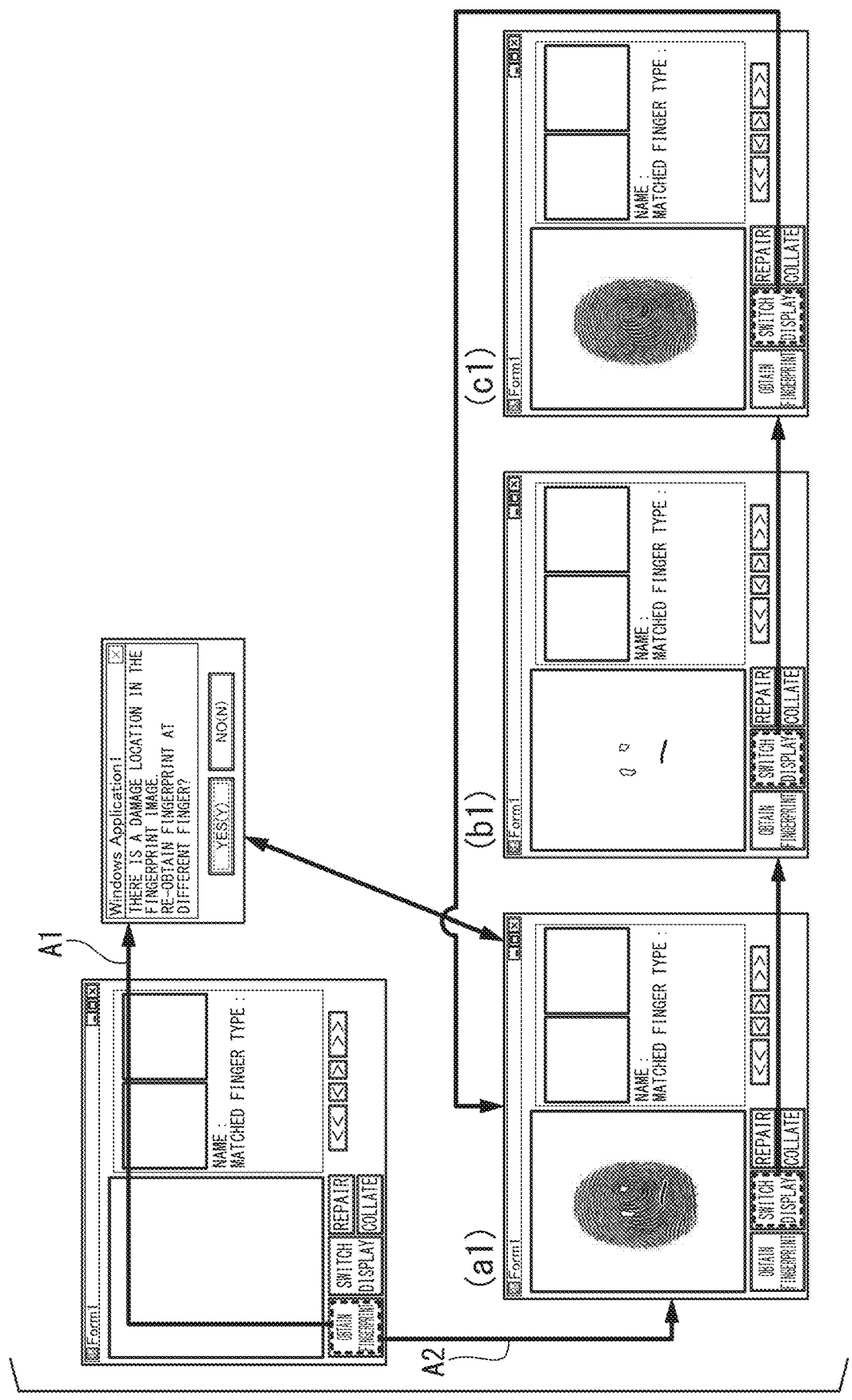
FIG. 19 is a schematic diagram that shows an example of the user interface of the device according to at least one of the first to third exemplary embodiments, relating to display control in the case of a unique region being detected in an obtained fingerprint image.

FIG. 19 is a schematic diagram that shows the user interface in the case of a unique region being detected in the obtained fingerprint image. When the "Obtain Fingerprint" button has been depressed by the user in the screen shown in the upper part of FIG. 19, the screen transitions to the screen shown on the left side in the lower part of FIG. 19.

In FIG. 19, the arrow A1 indicates the display of a message when there is a damage location. The arrow A2 indicates the display of a fingerprint as is when there is no damage location. As described below, the screen of portion (a1) of FIG. 19 is the screen in the case of displaying a fingerprint image and a damage location (however, when there is no damage location, a damage location is not displayed). The screen of portion (b1) of FIG. 19 is the screen in the case of displaying only the damage location. The screen of portion (c1) of FIG. 19 is the screen in the case of displaying only the fingerprint image.

In the left-side region of the screen shown in the lower part of FIG. 19, a fingerprint image is shown. At this time, it is detected by the information obtained by the detection result obtaining unit 12 that the fingerprint image includes a unique region. In the screen on the left side in the lower part of FIG. 19, the unique region in the fingerprint image is displayed with a display attribute which is different from that used for the other region. In the present case, specifically, the display control unit (21, 121) performs control so as to display the unique region and the other region in different colors. That is, in this screen (the screen of unit (a1)), both the fingerprint image and the damage location are displayed.

The unique region may also be displayed in a flashing manner. The color of the unique region may be made different from that of the other region, and only the unique region may be displayed in a flashing manner.

Since it has been established that a unique region (damage location of a fingerprint) is included in this fingerprint image, the biological pattern information processing device displays a popup screen (arrow A1). Displayed in the popup screen is the message "There is a damage location in the fingerprint image. Re-obtain fingerprint at different finger?" In this situation, the user can choose between either "Yes (Y)" or "No (N)".

The description will continue, returning to the screen on the left side of the lower part of FIG. 19. When the "Switch Display" button in the screen is depressed, the screen transitions to the screen in the middle of the lower part of FIG. 19 (the screen of the portion (b1)). In the screen in the middle of the lower part of FIG. 19, only the damage location (unique region) is displayed, with the fingerprint image not being displayed.

When the "Switch Display" button is depressed in the middle screen of the lower part of FIG. 19, the screen transitions to the screen on the right side of the lower part of FIG. 19 (the screen of portion (c1)). In the screen on the right side of the lower part of FIG. 19, only the fingerprint image is displayed on the left side region, with information indicating the damage location (unique region) not being displayed.

When the "Switch Display" button is depressed in the screen on the right side of the lower part of FIG. 19, the screen transitions (returns) to the screen on the left side of the lower part of FIG. 19.

That is, by means of the Switch Display button, it is possible to sequentially cycle the screen between "fingerprint image+damage location (unique region)", "damage location (unique region) only", and "only fingerprint image".

That is, the display control unit controls the display so as to switch between a display of either one of the unique region and a region other than the unique region, and a display of both the unique region and a region other than the unique region.

By performing control of such a switching display, the user can visually determine whether there are damage marks by confirming only the unique region.

Figure 20:
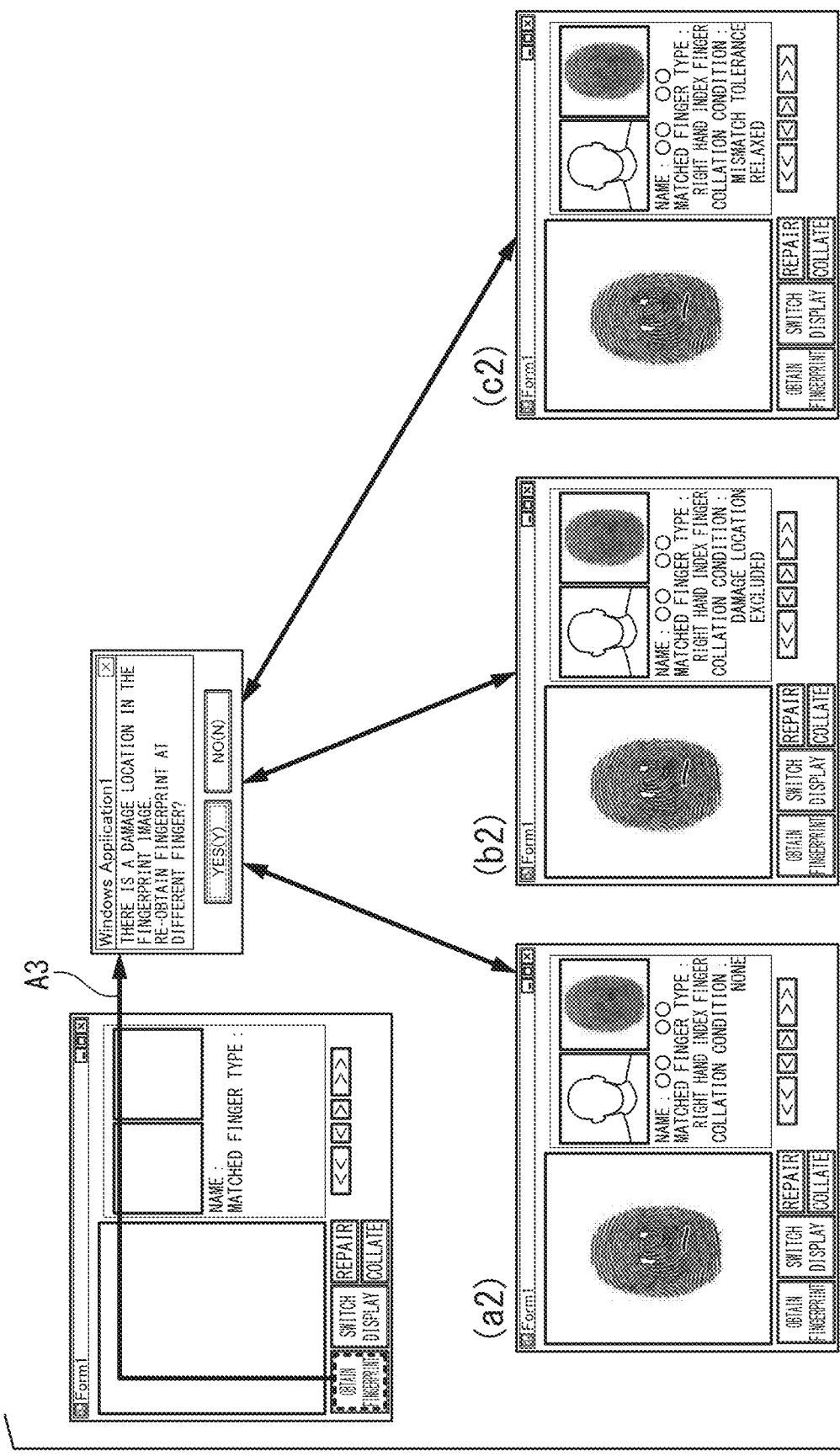
FIG. 20 is a schematic diagram that shows an example of the user interface of the device according to at least one of the first to third exemplary embodiments, relating to selection of a condition of a collation process in the case of a unique region being detected in an obtained fingerprint image.

FIG. 20 is a schematic diagram that shows the user interface that allows a user to select the manner of the collation process when a unique region is detected in the obtained fingerprint image.

In FIG. 20, the arrow A3 indicates the display of a message when there is a damage location. As described below, the screen of unit (a2) of FIG. 20 is the screen for type (1-1), that is, the case of no collation condition. The screen of unit (b2) of FIG. 20 is the screen for type (1-2), that is, the case of no exclusion of a damage location. The screen of unit (c2) of FIG. 20 is the screen for type (1-3), that is, the case of the mismatch tolerance being relaxed.

The screen (window) on the left side of the upper part of FIG. 20 is the same as the screen on the left side of the upper part of FIG. 19.

In the user interface shown in FIG. 20, when a damage location (unique region) has been detected in the obtained fingerprint image, the user can select a suitable operation from three types of operations. The three types are the following (1-1) to (1-3).

Type (1-1): Performs collation as is (no collation condition).

Type (1-2): Extracts only the portion estimated to not be damaged, and performs collation with the information only of that portion (damage location exclusion).

Type (1-3): Performs collation by relaxing the misalignment tolerance and the mismatch tolerance of the fingerprint features during collation (tolerance relaxation).

The collating unit 116 performs collation processing with the condition selected by the user among these.

When there is a damage location, and as a result of the collation process a fingerprint that matches is found, the background color of the matched information is changed for emphasis. In doing so, indication is given as to under which condition among the aforementioned three conditions was the match found by the collation (for example, "Collation condition: damage location exclusion" or "Collation condition: mismatch tolerance relaxation" and the like).

The user interface described in FIG. 20 is unrelated to the first exemplary embodiment in which a collation process is not performed.

Figure 21:
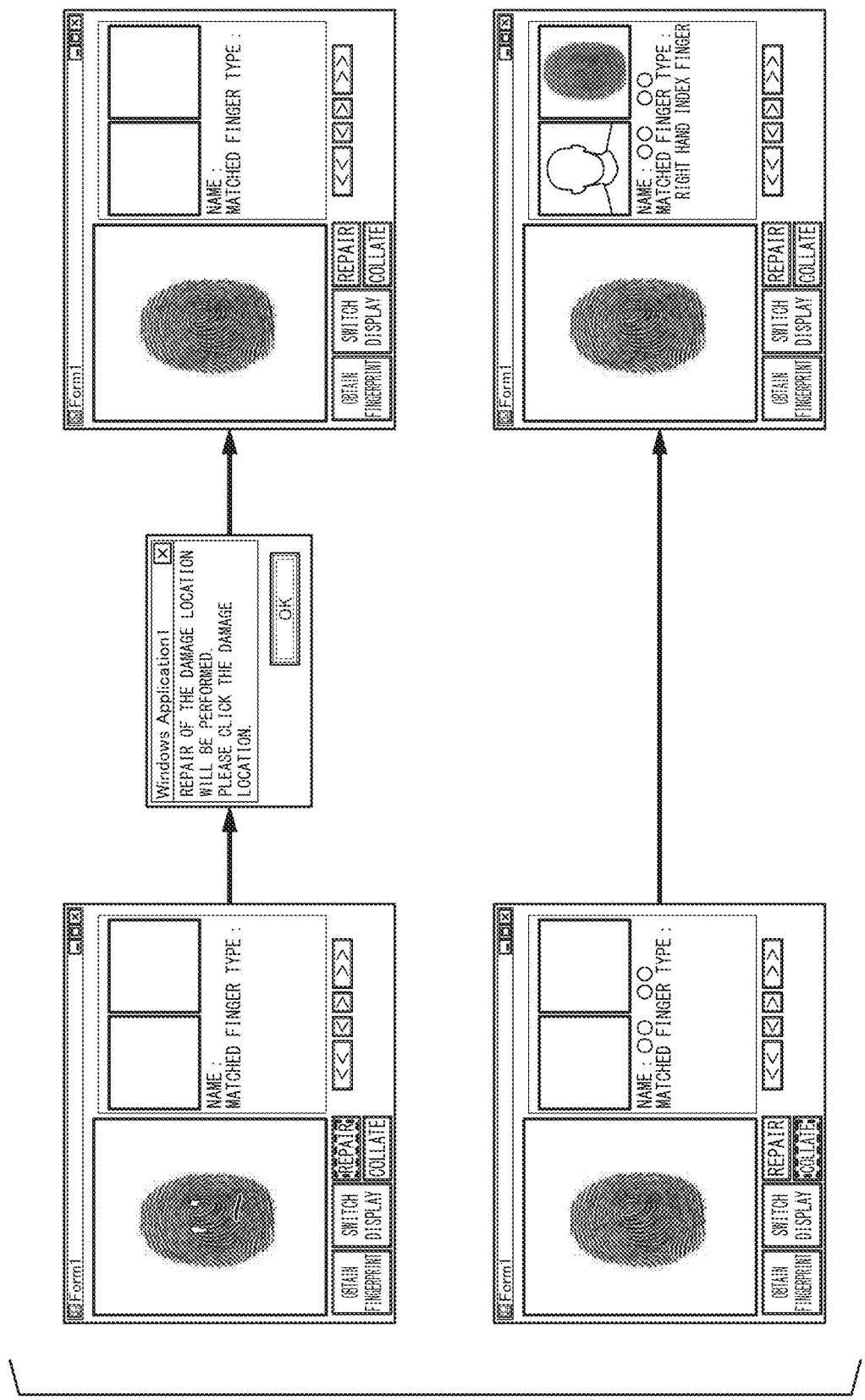
FIG. 21 is a schematic diagram that shows an example of the user interface of the device according to at least one of the first to third exemplary embodiments, relating to the repair process of a damage location (unique region).

FIG. 21 is a schematic diagram that shows a user interface related to the repair process of a damage location (unique region).

The fingerprint shown in the screen on the left side of the upper part of FIG. 21 includes a damage location (unique region). The user is able to press the "Repair" button. In this situation, the message "Repair of the damage location will be performed. Please click the damage location." is displayed in a popup screen. When the user presses the "OK" button, the process to repair the damage location is executed. It is also possible to automatically perform repair of the damage location on the basis of the ridge direction in the vicinity of the damage location as described above.

The screen on the left side of the bottom part of FIG. 21 is a display example following execution of the repair process. In this situation, when the user presses the "Collation" button, the collating unit 116 performs the collation process using the fingerprint image after repair.

When a match is found among pre-registered fingerprints, as shown in the screen on the right side of the lower part of FIG. 21, the matched fingerprint image and the individual identification information are displayed. A facial photograph may also be displayed along with the individual identification information.

That is, the display control unit performs control so as to obtain and display biological pattern information that has been repaired to biological pattern information with no unique region on the basis of the unique region information.

Thereby, the user can visually confirm the repaired image.

The user interface described in FIG. 21, being premised on a repair process, is unrelated to the first exemplary embodiment and second exemplary embodiment.

The functions of the biological pattern information processing device according to the exemplary embodiments and modifications described above may be realized by a computer. In that case, a program for realizing the functions of this device may be recorded in a computer-readable recording medium, with the program recorded on this recording medium being read into a computer system and executed. Note that "computer system" here includes an OS or hardware such as a peripheral. Further, "computer-readable recording medium" refers to a portable medium such as a flexible disk, a magneto-optical disk, a ROM, a CD-ROM or a storage device such as a hard disk built in the computer system. Furthermore, "computer-readable recording medium" may include a medium that dynamically holds a program for a short period of time, such as a communication line when a program is transmitted via a network such as the Internet or a communication line such as a telephone line, and a medium that holds a program in a fixed period of time, such as a volatile memory in a computer system serving as a server or client in the above situation. The aforementioned program may be one for implementing some of the above functions, or the above functions may be implemented in combination with a program already recorded on the computer system.

Each of the exemplary embodiments may be carried out as the following modification. That is, when biological pattern information obtained by the biological pattern information obtaining unit is judged to include a unique region on the basis of information of a unique region (damage location) in biological pattern information obtained by the unique region detection result obtaining unit, an authenticating unit performs an authentication process using information for authentication other than that biological pattern information. Specifically, when it becomes clear that a fingerprint that is biological pattern information includes a unique region, an authentication means other than a fingerprint image (authentication by facial recognition, authentication by vein pattern recognition, and the like) is used. The biological pattern information processing device includes such an authenticating unit.

Exemplary embodiments of the present invention have been described in detail with reference to the drawings. However, specific configurations are not limited to the described exemplary embodiments, and designs not departing from the scope of the invention are included.

This application is based upon and claims the benefit of priority from Japanese patent application No. 2015-074424, filed Mar. 31, 2015, the disclosure of which is incorporated herein in its entirety by reference.

INDUSTRIAL APPLICABILITY

The present invention can be utilized in a social system that uses fingerprint collation.

REFERENCE SYMBOLS 1, 2, 3: Biological pattern information processing device
11: Biological pattern information obtaining unit
12: Unique region detection result obtaining unit
21, 121: Display control unit
61: Unique region detecting unit
62: Pre-registered biological pattern information storage unit
91, 93: Damaged area detecting unit
92: Z-plasty operation fingerprint restoring unit
94: Damaged area removing unit
116: Collating unit
214, 214a: Repairing unit

The invention claimed is:

1. A fingerprint information processing device comprising:
   at least one memory storing instructions; and
   at least one processor configured to execute the instructions to:
   obtain unique region information that is detected based on fingerprint information representing a fingerprint, the unique region information representing a unique region included in the fingerprint, the fingerprint having a damaged biological pattern within the unique region;
   cause a display attribute, the unique region, and a region of the fingerprint other than the unique region to be displayed based on the obtained unique region information, the display attribute being indicative of being the unique region;
   cause, according to a type of the unique region, a process that is executable with respect to the unique region to be displayed;
   determine an abnormality degree of the unique region;
   repair the damaged biological pattern within the unique region; and
   collate the fingerprint information including the unique region in which the damaged biological pattern has been repaired.

2. The fingerprint information processing device according to claim 1, wherein the at least one processor is configured to execute the instructions to: cause the type of the unique region to be displayed based on the unique region information.

3. The fingerprint information processing device according to claim 1, wherein the at least one processor is configured to execute the instructions to: switch display between: display of the unique region; display of the region of the fingerprint other than the unique region; and both of the display of the unique region and the display of the region of the fingerprint other than the unique region.

4. The fingerprint information processing device according to claim 1, wherein the at least one processor is configured to execute the instructions to:
   obtain fingerprint information that has been repaired to fingerprint information with no unique region based on the unique region information; and
   cause the repaired fingerprint information to be displayed.

5. A fingerprint information processing method comprising:
   obtaining unique region information that is detected based on fingerprint information representing a fingerprint, the unique region information representing a unique region included in the fingerprint, the fingerprint having a damaged biological pattern within the unique region;
   causing a display attribute, the unique region, and a region of the fingerprint other than the unique region to be displayed based on the obtained unique region information, the display attribute being indicative of being the unique region;
   causing, according to a type of the unique region, a process that is executable with respect to the unique region to be displayed;
   determining an abnormality degree of the unique region;
   repairing the damaged biological pattern within the unique region; and
   collating the fingerprint information including the unique region in which the damaged biological pattern has been repaired.

6. The fingerprint information processing method according to claim 5, further comprising:
causing the type of the unique region to be displayed based on the unique region information.

7. The fingerprint information processing method according to claim 5, further comprising:
switching display between: display of the unique region; display of the region of the fingerprint other than the unique region; and both of the display of the unique region and the display of the region of the fingerprint other than the unique region.

8. The fingerprint information processing method according to claim 5, further comprising:
obtaining fingerprint information that has been repaired to fingerprint information with no unique region based on the unique region information; and
causing the repaired fingerprint information to be displayed.

9. A non-transitory computer-readable recording medium storing a program that causes a computer to execute:
obtaining unique region information that is detected based on fingerprint information representing a fingerprint, the unique region information representing a unique region included in the fingerprint, the fingerprint having a damaged biological pattern within the unique region;
causing a display attribute, the unique region, and a region of the fingerprint other than the unique region to be displayed based on the obtained unique region information, the display attribute being indicative of being the unique region;
causing, according to a type of the unique region, a process that is executable with respect to the unique region to be displayed;
determining an abnormality degree of the unique region;
repairing the damaged biological pattern within the unique region; and
collating the fingerprint information including the unique region in which the damaged biological pattern has been repaired.

10. The fingerprint information processing device according to claim 1, wherein the display attribute is an attribute that enables the unique region to be distinguished from the region of the fingerprint other than the unique region.

11. The fingerprint information processing method according to claim 5, wherein the display attribute is an attribute that enables the unique region to be distinguished from the region of the fingerprint other than the unique region.

12. The fingerprint information processing device according to claim 1, wherein the abnormality degree is determined based on at least one of direction change of a ridge of the fingerprint or pitch change of the ridge.

13. The fingerprint information processing device according to claim 1, wherein the abnormality degree is expressed with gradations.

14. The fingerprint information processing device according to claim 1, wherein the at least one processor is configured to execute the instructions to:
determine whether or not the unique region was produced by Z-plasty; and
cause a button for selecting whether or not to perform a repair process to be displayed when it is determined that the unique region was produced by the Z-plasty.

15. The fingerprint information processing device according to claim 14, wherein the at least one processor is configured to execute the instructions to: cause a button for selecting whether or not to perform a collation process using the fingerprint information in which unique region has been repaired by the repair process.

* * * * *